US012793133B2

(12) United States Patent
Kim et al.

(10) Patent No.: US 12,793,133 B2
(45) **Date of Patent: *Nov. 10, 2026**

(54) APPARATUS FOR HIGH FREQUENCY TRADING AND METHOD OF OPERATING THEREOF

(71) Applicant: REBELLIONS INC., Seongnam-si (KR)

(72) Inventors: Hyunsung Kim, Seongnam-si (KR); Sungyeob Yoo, Seongnam-si (KR); Sunghyun Park, Seongnam-si (KR); Jinwook Oh, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 55 days.

This patent is subject to a terminal disclaimer.

(21) Appl. No.: 19/017,345

(22) Filed: Jan. 10, 2025

(65) Prior Publication Data

US 2025/0148535 A1 May 8, 2025

Related U.S. Application Data

(63) Continuation of application No. 18/365,945, filed on Aug. 4, 2023, now Pat. No. 12,229,829, which is a (Continued)

(30) Foreign Application Priority Data

Nov. 16, 2021 (KR) ........................ 10-2021-0158053

(51) Int. Cl.

*G06Q 40/00* (2023.01)
*G06Q 30/0202* (2023.01)
*G06Q 40/04* (2012.01)

(52) U.S. Cl.

CPC ......... *G06Q 40/04* (2013.01); *G06Q 30/0202* (2013.01)

(58) Field of Classification Search

None

See application file for complete search history.

(56) References Cited

U.S. PATENT DOCUMENTS

2019/0014121 A1 1/2019 Nakamura
2019/0244288 A1* 8/2019 Singh .................... G06Q 40/04

(Continued)

FOREIGN PATENT DOCUMENTS

CN 112181382 A 1/2021
CN 212846785 U 3/2021

(Continued)

OTHER PUBLICATIONS

Extended European Search Report for EP 22895912.8 by European Patent Office dated Jul. 24, 2024.

(Continued)

*Primary Examiner* — Olabode Akintola

(74) *Attorney, Agent, or Firm* — BROADVIEW IP LAW, PC

(57) ABSTRACT

The disclosure relates to an apparatus for high frequency trading. The apparatus includes one or more memories, at least one reconfigurable processor coupled to the one or more memories, and a dedicated accelerator preconfigured for the machine learning model. The one or more processors receive market-related information from one or more market-related information servers and generates market prediction reference data based on the market-related information. The dedicated accelerator performs operations for the machine learning model with the market prediction reference data to generate future market prediction data. The at least one reconfigurable processor generates an order signal (Continued)

based on the future market prediction data and transmits the order signal to a target exchange server.

20 Claims, 13 Drawing Sheets

Related U.S. Application Data continuation of application No. 18/045,104, filed on Oct. 7, 2022, now Pat. No. 11,763,386.

(56) References Cited

U.S. PATENT DOCUMENTS

| | | | |
|---|---|---|---|
| 2019/0370630 | A1 | 12/2019 | Yang |
| 2021/0035214 | A1 | 2/2021 | Kim et al. |
| 2021/0056389 | A1 | 2/2021 | Yang |
| 2021/0133543 | A1 | 5/2021 | Lim et al. |

FOREIGN PATENT DOCUMENTS

| | | | |
|---|---|---|---|
| EP | 3522098 | A1 | 8/2019 |
| JP | 2019-16151 | A | 1/2019 |
| KR | 10-2021-0015582 | A | 2/2021 |
| KR | 10-2021-0063765 | A | 6/2021 |
| WO | 2020/232294 | A1 | 11/2020 |

OTHER PUBLICATIONS

Kahssay, N. et al. "6.111 final: HFT Accelerator" Dec. 2019.
Office Action for GB 2216333.1 by Intellectual Property Office (United Kingdom) dated Apr. 30, 2026.

* cited by examiner

APPARATUS FOR HIGH FREQUENCY TRADING AND METHOD OF OPERATING THEREOF

CROSS-REFERENCE TO RELATED APPLICATION

This application is a continuation of U.S. application Ser. No. 18/365,945 filed on Aug. 4, 2023, which is a continuation of U.S. application Ser. No. 18/045,104 filed on Oct. 7, 2022, now granted U.S. Pat. No. 11,763,386, issued on Sep. 19, 2023, which claims priority under 35 U.S.C. § 119 to Korean Patent Application No. 10-2021-0158053, filed in the Korean Intellectual Property Office on Nov. 16, 2021, the entire contents of which are hereby incorporated by reference.

TECHNICAL FIELD

The present disclosure relates to an apparatus for high frequency trading and a method of operating thereof, and more specifically, but not limited to, an apparatus for generating orders for high frequency trading using an accelerator for a machine learning model and at least one processor capable of reprogramming and/or design change, and a method of operating thereof.

BACKGROUND

High frequency trading is a trading method of trading with high frequency (e.g., hundreds to thousands of times per second) within a short period of time by using minute price variations of securities such as stocks, bonds, derivatives, etc. For the high frequency trading, fast processing speed is very important. In general, the shorter the time it takes to process the trading algorithms based on the input information and output the result, the more advantageous it can get in trading.

Meanwhile, high frequency trading using machine learning models has an advantage of being able to find features that the traditional algorithms cannot find from the complex information in the market. However, in order to store and process the computations of the machine learning model, a processor having large storage spaces and operational resources is required, but there is a problem in that the processor used for high frequency trading generally does not have these resources.

In addition, there is a problem in that a processor suitable for driving a machine learning model is not suitable for performing a pre-processing process or a post-processing process which may be frequently changed according to market conditions, because the greater flexibility will lead to a lower efficiency.

The description set forth in the background section should not be assumed to be prior art merely because it is set forth in the background section. The background section may describe aspects or embodiments of the present disclosure.

SUMMARY

In order to solve the problems described above, the present disclosure provides an apparatus for high frequency trading, an operating method thereof, and a non-transitory computer-readable recording medium storing instructions.

The present disclosure may be implemented in a variety of ways, including a method, an apparatus (system), or a non-transitory computer-readable storage medium storing instructions.

An apparatus for high frequency trading according to an embodiment of the present disclosure may comprises one or more memories, at least one reconfigurable processor coupled to the one or more memories, the one or more processors configured to receive market-related information from one or more market-related information servers and generate market prediction reference data based on the market-related information, a dedicated accelerator preconfigured for the machine learning model, the dedicated accelerator configured to receive the market prediction reference data, perform operations for the machine learning model to generate future market prediction data, and provide the future market prediction data to the at least one reconfigurable processor, wherein the at least one reconfigurable processor is further configured to generate an order signal based on the future market prediction data and transmit the order signal to a target exchange server.

According to an embodiment, the at least one reconfigurable processor may be implemented as a field programmable gate array (FPGA), and the dedicated accelerator may be implemented as an integrated circuit for a neural processing unit (NPU).

According to an embodiment, the one or more market-related information servers may include at least one of one or more reference exchange servers, one or more news providing servers, one or more social network service (SNS) servers, or one or more online shopping service servers.

According to an embodiment, the at least one reconfigurable processor may be further configured to determine a prediction complexity based on the market prediction reference data, and determine an appropriate way according to the determined prediction complexity. If it is determined that the appropriate way is a predetermined rule, the at least one reconfigurable processor may be further configured to generate the order signal according to the predetermined rule based on the market prediction reference data. If it is determined that the appropriate way is the machine learning model, the dedicated accelerator may be further configured to perform operations for the machine learning model to generate the future market prediction data and provide the future market prediction data to the at least one reconfigurable processor so that the at least one reconfigurable processor generates the order signal based on the future market prediction data.

According to an embodiment, the apparatus may further comprise a host device configured to drive a trading engine, wherein the prediction complexity may include three complexity classes according to the complexity, and the market prediction reference data may be provided to at least one of the at least one reconfigurable processor, the host device or the dedicated accelerator for the machine learning model according to the three complexity classes to generate the order signal.

According to an embodiment, the at least one reconfigurable processor may be further configured to parse and decode the market-related information, and generate the market prediction reference data based on the parsed and decoded market-related information.

According to an embodiment, wherein the market prediction reference data may include one or more reference features for one or more reference items at one or more time points.

According to an embodiment, the one or more reference items may include a reference item representing a leading indicator, and a target item to be ordered.

According to an embodiment, the at least one reconfigurable processor may be further configured to process the generated order signal according to a protocol required by the target exchange server.

According to an embodiment, the market-related information may include information on an order book of one or more reference items in a reference exchange associated with a reference exchange server, and a response to a previous order in the target exchange associated with the target exchange server.

According to an embodiment, a method of operating an apparatus for high frequency trading including at least one reconfigurable processor may comprise receiving, by the at least one reconfigurable processor, market-related information from one or more market-related information servers, generating, by the at least one reconfigurable processor, market prediction reference data based on the market-related information, transmitting, by the at least one reconfigurable processor, the market prediction reference data to a dedicated accelerator preconfigured for the machine learning model and configured to perform operations of the machine learning model with the market prediction reference data to generate future market prediction data, receiving, by the at least one reconfigurable processor, the future market prediction data from the dedicated accelerator, generating, by the at least one reconfigurable processor, an order signal based on the future market prediction data and transmitting the order signal to a target exchange server.

According to an embodiment, the one or more market-related information servers may include at least one of one or more reference exchange servers, one or more news providing servers, one or more social network service (SNS) servers, or one or more online shopping service servers.

According to an embodiment, the method may further comprise determining, by the at least one reconfigurable processor, a prediction complexity based on the market prediction reference data, determining, by the at least one reconfigurable processor, an appropriate way according to the determined prediction complexity, if it is determined that the appropriate way is a predetermined rule, generating, by the at least one reconfigurable processor, the order signal according to the predetermined rule based on the market prediction reference data, and if it is determined that the appropriate way is the machine learning model, transmitting, by the at least one reconfigurable processor, the market prediction reference data to the dedicated accelerator configured to perform operations of the machine learning model operations for the machine learning model with the market prediction reference data to generate future market prediction data.

According to an embodiment, the prediction complexity may include three complexity classes according to the complexity, and the market prediction reference data may be provided to at least one of the at least one reconfigurable processor, a host device or the NPU according to the three complexity classes to generate the order signal.

According to an embodiment, the method may further comprise parsing and decoding, by the at least one reconfigurable processor, the market-related information, and wherein generating the market prediction reference data may comprise generating the market prediction reference data based on the parsed and decoded market-related information.

According to an embodiment, the market prediction reference data may include one or more reference features for one or more reference items at one or more time points.

According to an embodiment, the one or more reference items may include a reference item representing a leading indicator, and a target item to be ordered.

According to an embodiment, the method may further comprise processing, by the at least one reconfigurable processor, the generated order signal according to a protocol required by the target exchange server.

According to an embodiment, the market-related information may include information on an order book of one or more reference items in a reference exchange associated with a reference exchange server, and a response to a previous order in the target exchange associated with the target exchange server.

According to an embodiment, an apparatus for high frequency trading may comprise one or more memories, at least one reconfigurable processor coupled to the one or more memories, the one or more processors configured to cause receiving market-related information from one or more market-related information servers, generating market prediction reference data based on the market-related information, transmitting the market prediction reference data to a dedicated accelerator preconfigured for the machine learning model and configured to perform operations of the machine learning model with the market prediction reference data to generate future market prediction data, receiving the future market prediction data from the dedicated accelerator, generating an order signal based on the future market prediction data, and transmitting the order signal to a target exchange server.

According to some embodiments of the present disclosure, by using a machine learning model, it is possible to find features that classical algorithms cannot find from complex market conditions, and also predict future market conditions and use this to generate orders to gain an advantage in trading.

According to some embodiments of the present disclosure, the processor running the machine learning model may be configured with a dedicated accelerator (e.g., NPU ASIC) to process the operations of the machine learning model quickly and efficiently, and the pre/post-processing can be flexibly changed in accordance with the changed market conditions by using a processor capable of reprogramming or re-designing (e.g., FPGA). In this way, by using two or more different processors, it is possible to simultaneously achieve both the implementation of flexible pre/post-processing and efficient and fast arithmetic processing of machine learning models.

According to some embodiments of the present disclosure, by determining the prediction complexity based on the input data, it is possible to generate order-related data by using the machine learning model when the prediction complexity is high so as to find the features that classical algorithms cannot find and also predict future market conditions, and generate the order data directly by using relatively simple trading logic when the prediction complexity is low so as to quickly transmit orders and gain an edge in trading.

According to some embodiments of the present disclosure, in the device (e.g., FPGA), by performing a series of processes including processing the market data and using the result to generate order data, and transmitting an order, latency can be minimized.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
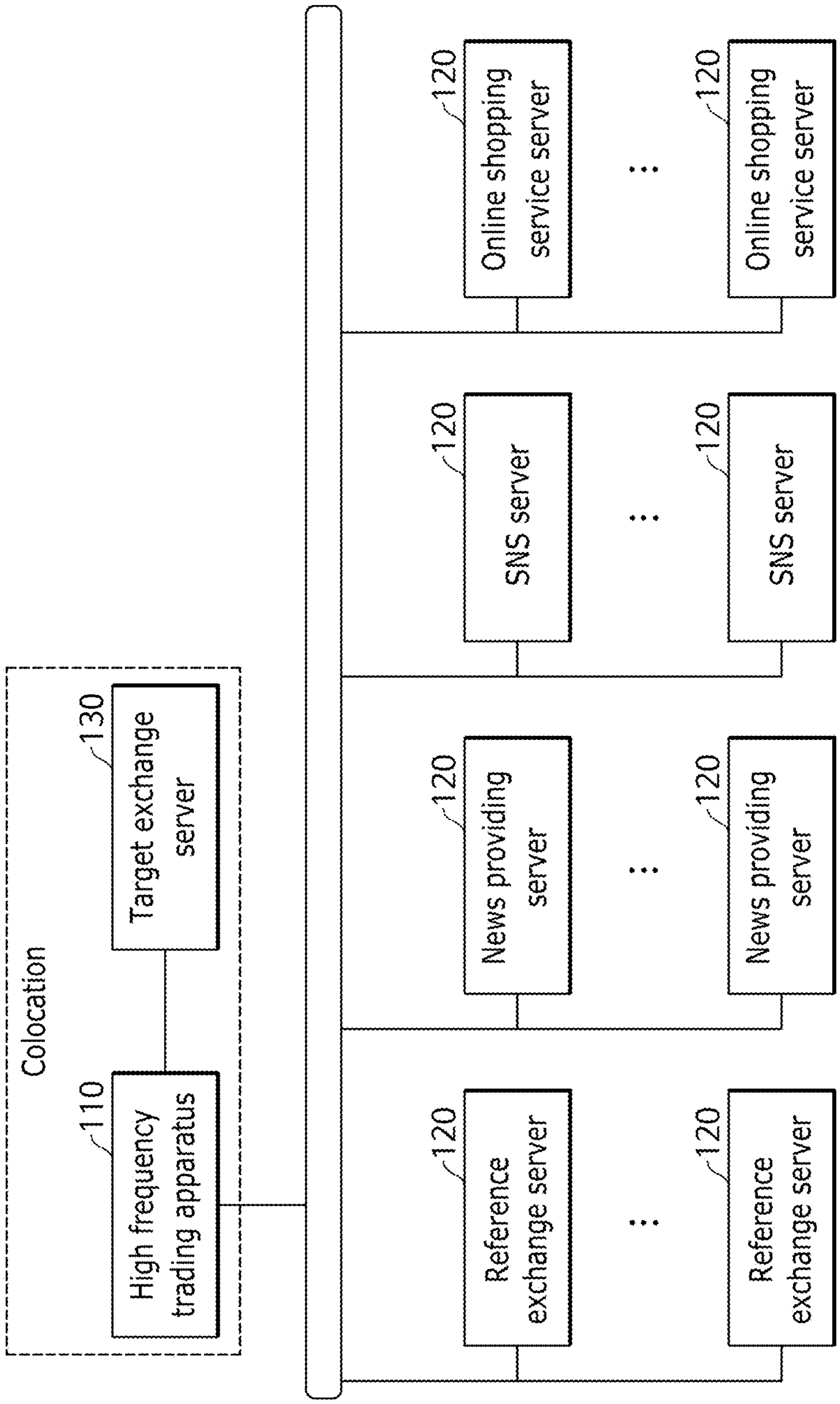
FIG. 1 is a schematic diagram illustrating an operation example of a high frequency trading apparatus according to an embodiment of the present disclosure.

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding elements are assigned the same reference numerals. In addition, in the following description of the embodiments, duplicate descriptions of the same or corresponding components may be omitted. However, even if descriptions of components are omitted, it is not intended that such components are not included in any embodiment.

Advantages and features of the disclosed embodiments and methods of accomplishing the same will be apparent by referring to embodiments described below in connection with the accompanying drawings. However, the present disclosure is not limited to the embodiments disclosed below, and may be implemented in various forms different from each other, and the present embodiments are merely provided to make the present disclosure complete, and to fully disclose the scope of the invention to those skilled in the art to which the present disclosure pertains.

The terms used herein will be briefly described prior to describing the disclosed embodiments in detail. The terms used herein have been selected as general terms which are widely used at present in consideration of the functions of the present disclosure, and this may be altered according to the intent of an operator skilled in the art, conventional practice, or introduction of new technology. In addition, in specific cases, certain terms may be arbitrarily selected by the applicant, and the meaning of the terms will be described in detail in a corresponding description of the embodiments. Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to reproduce one or more processors. Accordingly, as an example, the "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

According to an embodiment, the "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to, comprise, be implemented as, or be included in an application-specific integrated circuit (ASIC), a programmable logic device (PLD), a field-programmable gate array (FPGA), and so on. The "processor" may refer to a combination of processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EE-PROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, "system" may refer to at least one of a server device or a cloud device, but not limited thereto. For example, the system may include one or more server devices. In another example, the system may include one or more cloud devices. In still another example, the system may include both the server device and the cloud device operated in conjunction with each other.

In the present disclosure, the "machine learning model" may include any model that is used for inferring an answer to a given input. According to an embodiment, the machine learning model may comprise, refer to, or be implemented as an artificial neural network (ANN), a deep neural network (DNN), a convolutional neural network (CNN), a recurrent neural network (RNN), a generative adversarial network (GAN), or a combination of some or all of the foregoing. For example, the ANN may include an input layer, a plurality of hidden layers, and an output layer. Each layer may include a plurality of nodes.

In the present disclosure, "display" may refer to, but not limited to, any display device associated with a computing device, and for example, it may refer to any display device that is controlled by the computing device, or that can display any information/data provided from the computing device.

In the present disclosure, "each of a plurality of A" may refer to each of all components included in the plurality of A, or may refer to each of some of the components included in a plurality of A.

The phrases "A, B, or C," "at least one of A, B, and C," or "at least one of A, B, or C" may refer to only A, only B, only C, or any combination of A, B, and C.

In the present disclosure, the term "item", "tradable item" or "security" may refer to, but not limited to, any form of tradable financial assets such as stocks, bonds, derivatives (options, futures, etc.) index-related items, industrial sector-related items, items for specific commodities (e.g., crude oil, agricultural products, gold, etc.), exchange rate-related items, cryptocurrencies, etc.

In the present disclosure, a "exchange server" may refer to, but not limited to, a system through which brokers and traders can buy and sell tradable items such as securities circulated in at least one country.

In the present disclosure, an "Order Book (OB)" may, but not limited to, include a list in which information on buy or sell orders (ask price, quantity, information on buyers or sellers, etc.) of buyers and sellers existing in the securities market is recorded.

In the present disclosure, the "Top of the Book (ToB)" may include, but not limited to, information on the highest bid price and lowest bid price.

FIG. 1 is a schematic diagram illustrating an operation example of a high frequency trading apparatus according to an embodiment of the present disclosure.

As shown in FIG. 1, a high frequency trading apparatus 110, one or more market-related information servers 120, and a target exchange server 130 may be involved for the high frequency trading according to embodiments of the present disclosure.

The high frequency trading apparatus 110 may collect market-related information from one or more market-related information servers 120. The high frequency trading apparatus 110 may generate an order signal ordering a tradable item with a specific condition based on the collected market-related information and send the order signal to the target exchange server 130.

The one or more market-related information servers 120 may include at least one of one or more reference exchange servers, one or more news providing servers, one or more social network service (SNS) servers, or one or more online shopping service servers. The one or more reference exchange servers may be associated with one or more reference exchange, respectively. Each reference exchange server of the one or more reference exchange servers may refer to a reference exchange server associated with a reference exchange in which traders trade one or more tradable items affecting the price of a target tradable item. Each reference exchange server of the one or more reference exchange servers may provide market data of the associated reference exchange. The one or more reference exchange servers 120 may include the target exchange server 130. Each of the one or more news providing servers may provide news affecting the price of the target tradable item. Each of the one or more social network service (SNS) servers may provide SNS information affecting the price of the target tradable item. For example, the SNS information may include contents of article affecting the price of the target tradable item, the number of views of the article, and the number of followers following the author of the article. Each of the one or more online shopping service servers may provide shopping information affecting the price of the target tradable item. For example, the shopping information may include the price change, supply and demand of an item affecting the price of the target tradable item.

The target exchange server 130 may refer to an exchange server associated with a target exchange in which the target tradable item is traded.

The one or more market reference information providing servers 140 may provide market reference information. The one or more market reference information providing servers 140 may include.

According to an embodiment, the high frequency trading apparatus 110 may predict the market of the target exchange at a future time (e.g., at a near future time after a predetermined time) based on market-related information such as market data of one or more exchanges, news information, SNS information, and shopping information. And then, the high frequency trading apparatus 110 may generate an order signal for a target tradable item based on the market prediction and transmit it to the target exchange server 130. For high frequency trading, it is very important to generate and transmit orders at a high speed based on the market prediction. For this reason, in high frequency trading, even microsecond latency must be considered, and the high frequency trading apparatus 110 may be collocated close to the target exchange server 130 in order to reduce the latency.

According to an embodiment, the high frequency trading apparatus 110 may receive market data of the reference exchanges from the one or more reference exchange servers 120. In this example, the market data may include data on tradable items traded in the reference exchanges associated with the one or more reference exchange server 120. For example, the market data may include an order book of (at least some of) tradable items traded in the one or more reference exchange servers 120. In an embodiment, the market data may include data on a target tradable item. For example, the market data may include the top of an order book for the target tradable item, a list of (valid) orders for the target tradable item, a response of the target exchange server 130 to a previous order for the target tradable item, etc. In another embodiment, if the high frequency trading apparatus 110 is collocated far from a market-related information server, the data of the market-related information server 120 may be excluded from the market-related information in consideration of the relatively long latency before receiving the data of the market-related information server.

According to an embodiment, the high frequency trading apparatus 110 may analyze market-related information to generate an order. For example, the high frequency trading apparatus 110 may analyze market-related information (or market prediction reference data generated based on the market-related information), to predict market (e.g., the price of a target item) at a future time point (e.g., 1 second later), and generate an order based on the market prediction.

According to an embodiment, the process of analyzing the market-related information and/or market prediction reference data generated based on the market-related information may be performed by a machine learning model. By using a machine learning model, it is possible to find features that classical algorithms cannot find from complex market conditions, and also predict future market and use the future market prediction to generate orders to gain an advantage in trading. Meanwhile, in high frequency trading, it is very important to analyze market-related information quickly and generate orders, but since a general processor does not have a storage space and operational resources for processing the computation of a complex machine learning model, there is a problem in that speed and efficiency are very limited if the machine learning model is driven using the general processor. Accordingly, the high frequency trading apparatus 110 according to an embodiment of the present disclosure may include a dedicated accelerator (e.g., a neural processing unit (NPU)) for a machine learning model, and the dedicated accelerator may be implemented as the ASIC.

Meanwhile, for using a machine learning model, appropriate pre/post-processing may be required. For example, a process of generating market prediction reference data for the machine learning model from market-related information or generating orders based on future market prediction data received from the machine learning model may be required. Such pre/post-processing may be continuously changed according to changes in market conditions, regulations, compensation rules for market makers, etc. Implementing such pre/post-processing units as the ASIC customized for a specific purpose may cause a problem in that changes in the pre/post processing requires re-manufacturing of a processor for performing the changed pre/post processing. Accordingly, processes excluding driving of the machine learning model may be performed by a reprogrammable, reconfigurable and/or design-changeable processor such as FPGA.

As described above, the processor running the machine learning model may be configured with a dedicated accelerator (e.g., NPU ASIC) predesigned or preconfigured to process the operations of the machine learning model quickly and efficiently. The pre/post-processing can be flexibly changed in accordance with the changed market conditions by using a processor capable of reprogramming and/or re-designing (e.g., FPGA). In this way, by using two or more different processors, it is possible to simultaneously achieve both the implementation of flexible pre/post-processing and efficient and fast arithmetic processing of machine learning models. The internal components of the high frequency trading apparatus 110 will be described in detail below with reference to FIGS. 2 to 4.

Figure 2:
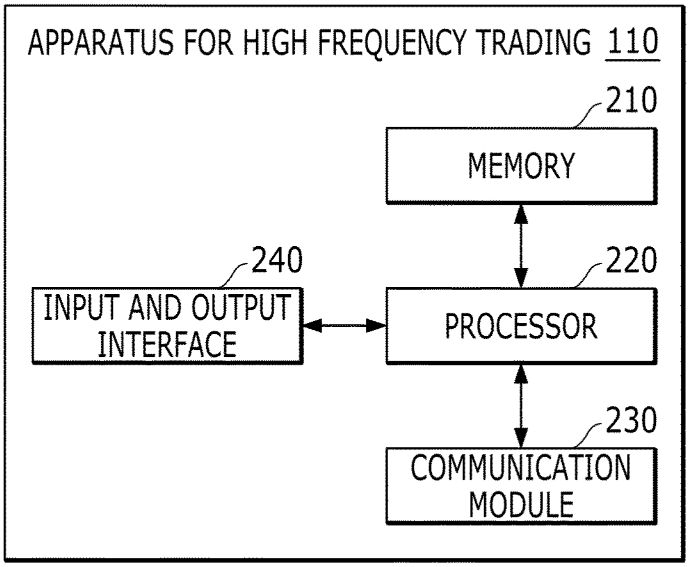
FIG. 2 is a block diagram illustrating internal components of a high frequency trading apparatus according to an embodiment of the present disclosure.

FIG. 2 is a block diagram illustrating internal components of the high frequency trading apparatus 110 according to an embodiment of the present disclosure.

The high frequency trading apparatus 110 may include a memory 210, a processor 220, a communication module 230, and an input and output interface 240. As illustrated in FIG. 2, the high frequency trading apparatus 110 may be configured to communicate information and/or data through a network by using the communication module 230.

The memory 210 may include any non-transitory computer-readable recording medium. According to an embodiment, the memory 210 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, etc. may be included in the high frequency trading apparatus 110 as a separate permanent storage device that is separate from the memory. In addition, an operating system and at least one program code (e.g., code for arithmetic processing, pre/post processing, and order transmission of a machine learning model installed and driven in the high frequency trading apparatus 110) may be stored in the memory 210. In FIG. 2, the memory 210 is illustrated as a single memory for convenience, but the processor 220 may include a plurality of memories.

These software components may be loaded from a computer-readable recording medium separate from the memory 210. Such a separate computer-readable recording medium may include a recording medium directly connectable to the high frequency trading apparatus 110, and may include a computer-readable recording medium such as a floppy drive, a disk, a tape, a DVD/CD-ROM drive, a memory card, etc., for example. In another example, the software components may be loaded into the memory 210 through the communication module 230 rather than the computer-readable recording medium. For example, at least one program may be loaded into the memory 210 based on a computer program (e.g., a program or the like for analyzing market-related information, predicting future markets, generating and transmitting orders, etc.) installed by the files provided by the developers, or by a file distribution system that distributes an installation file of an application through a communication module 230.

The processor 220 may be configured to process the commands of the computer program by performing basic arithmetic, logic, and input and output operations. The commands may be provided to a user terminal (not illustrated) or another external system by the memory 210 or the communication module 230. For example, the processor 220 may generate future market prediction data based on the market prediction reference data using the machine learning model, and may generate orders based on the future market prediction data. The generated orders may be transmitted to the target exchange server 130.

The communication module 230 may provide a configuration or function for the user terminal (not illustrated) and the high frequency trading apparatus 110 to communicate with each other through a network, and may provide a configuration or function for the high frequency trading apparatus 110 to communicate with an external system (e.g., a separate cloud system). For example, control signals, commands, data, etc. provided under the control of the processor 220 of the high frequency trading apparatus 110 may be transmitted to the user terminal and/or the external system through the communication module 230 and the network through the communication module of the user terminal and/or an external system. For example, the external system such as target exchange server 130 may receive the orders etc. from the high frequency trading apparatus 110.

In addition, the input and output interface 240 of the high frequency trading apparatus 110 may interface with a device (not illustrated) for input or output that may be connected to the high frequency trading apparatus 110 or may be included in the high frequency trading apparatus 110. For example, the input and output interface 240 may include at least one of a PCI express interface or an Ethernet interface. In FIG. 2, the input and output interface 240 is illustrated as a component configured separately from the processor 220, but embodiments are not limited thereto, and the input and output interface 240 may be configured to be included in the processor 220. The high frequency trading apparatus 110 may include more components than those illustrated in FIG. 2.

The processor 220 of the high frequency trading apparatus 110 may be configured to manage, process, and/or store the information and/or data received from a plurality of user terminals and/or a plurality of external systems such as one or more market-related information servers 120 and the target exchange server 130. According to an embodiment, the processor 220 may receive market-related information from the one or more market-related information servers 120. The processor may predict future market based on the received market-related information and generate orders based on the future market prediction. In FIG. 2, the processor 220 is illustrated as a single processor for convenience, but the processor 220 may include a plurality of processors. For example, the processor 220 may include at least one processor implemented in an FPGA for pre-processing and post-processing, and a dedicated accelerator implemented in an ASIC for a machine learning model, in which the at least one processor implemented in the FPGA may execute one or more instructions stored in a first memory, and the dedicated accelerator implemented in the ASIC may execute one or more instructions stored in a second memory.

Figure 3:
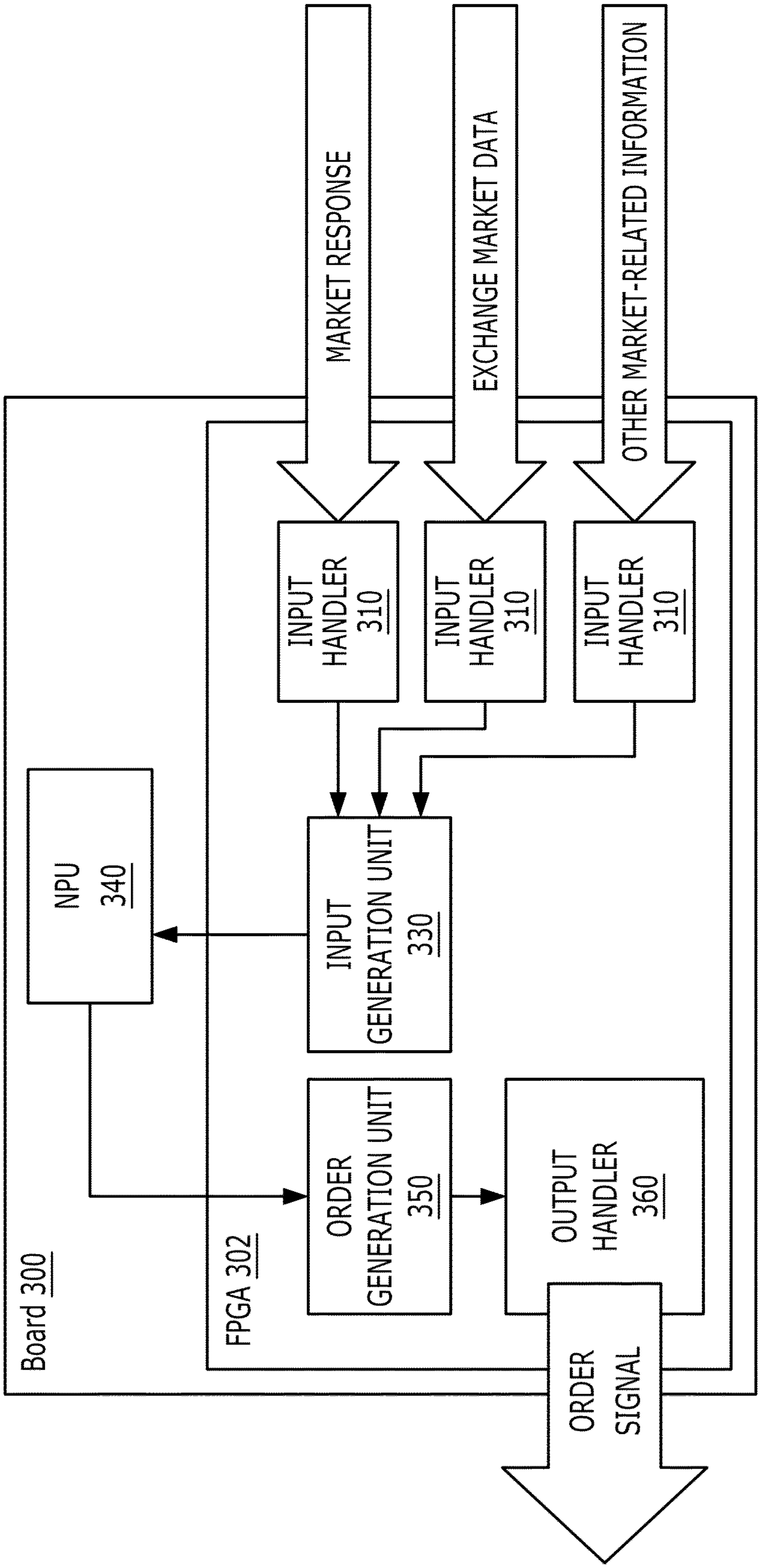
FIG. 3 is a diagram illustrating internal components of a processor according to an embodiment of the present disclosure.

FIG. 3 is a diagram illustrating internal components of the processor according to an embodiment.

According to an embodiment, the processor 300 (e.g., a processor in the high frequency trading apparatus 110 or high frequency order generating apparatus) may include FPGA 302 for pre/post processing and a dedicated accelerator 340 (e.g., a dedicated accelerator implemented as ASICs) for the machine learning model. The FPGA 302 for pre/post processing may include an input handler 310, an input generation unit 330, an order generation unit 350, and an output handler 360. Although the internal components of the processor are illustrated separately by function in FIG. 3, this does not necessarily mean that they are physically separated. In addition, the internal components of the processor illustrated in FIG. 3 are only an example, and it is not intended to depict essential configurations only. Accordingly, in some embodiments, the processor may be implemented differently, such as by additionally including components other than those internal components illustrated, or by omitting some of the illustrated components.

According to an embodiment, the processor may receive the market-related information from the one or more market-related information servers 120. The received market-related information may include data on items traded in the one or more exchanges associated with the one or more exchange servers. For example, the market-related information may include an order book of (at least some of) items traded in an exchange server, and additionally, the market-related information may include data on a target item. For example, the market-related information may include a top of an order book for the target item, a list of (valid) orders for the target item, the response to a previous order for the target item in the target exchange associated with the target exchange server 130, etc. The processor may receive the market-related information data from the one or more market-related information servers 120 every time the market-related information data needs to be updated, or may receive market-related information data periodically (e.g., every 0.1 seconds) from the one or more market-related information servers 120. Since it is important to process data at a high speed in high frequency trading, in an embodiment, the market-related information data may be received through a User Datagram Protocol (UDP) having a high data transmission rate. However, in some embodiments, other communication protocols (e.g., TCP/IP) may be used to receive market-related information data as needed (e.g., to ensure reliability of data).

The input handler 310 may parse and/or decode the received market-related information data. According to an embodiment, the market-related information data may be received in a plurality of data packets and may be received through a plurality of lines. If the market-related information data is received through a plurality of lines, each input handler 310 may parse and/or decode the market-related information data received through the plurality of lines in different ways according to the data format or standard. The market-related information data parsed/decoded through the input handler 310 may be provided to the input generation unit 330 to generate market prediction reference data as input data of the machine learning model.

The input generation unit 330 may generate the market prediction reference data based on at least a portion of the market-related information. According to an embodiment, the input generation unit 330 may select one or more reference features of one or more items from among the market-related information to form market prediction reference data. For example, the input generation unit 330 may include a feature extraction unit for extracting or selecting reference features included in the market prediction reference data.

In an embodiment, one or more items included in the market prediction reference data may include items that may be a leading indicator of a variation in market conditions of the target item. For example, if the target item to be ordered is the stock (spot) of Company A, data on futures stocks related to company A's stock, option stocks related to company A's stock, stocks related to company A included in other exchanges, futures stocks for products (e.g., crude oil, etc.) associated with company A, etc. may be included in the market prediction reference data. In addition, in an embodiment, the one or more reference features included in the market prediction reference data may include information meaningful in predicting market conditions of the target item. For example, the reference features may include various information extractable from the order book of one or more items, such as a market price (transaction price), a price and quantity at the top of the order book of a buying side, a price and quantity at the top of the order book of a selling side, the number of sellers wishing to sell, the ask price for buy of the next stage at the top of the order book, the ask price for sell of the next stage at the top of the order book, the variance of the ask price included in the order book, etc., information obtained by processing the information and/or reliability of the information, etc. The configuration of the market prediction reference data will be described below in more detail with reference to FIG. 8.

The market prediction reference data generated by the input generation unit 330 may be transmitted to the dedicated accelerator 340 as input data for the machine learning model and may be fed to the machine learning model. According to an embodiment, the dedicated accelerator 340 may be a neural processing unit (NPU) specialized for arithmetic processing of a machine learning model and may be implemented as an application-specific semiconductor (ASIC) specialized for driving a machine learning model. The dedicated accelerator 340 may use the machine learning model to derive future market prediction data associated with an order for a target item based on the market prediction reference data. For example, the dedicated accelerator 340 may receive the market prediction reference data as the input data to the machine learning model, and derive future market prediction data that predicts a price (e.g., a market price or a median price) of the target item at a specific time in the future. According to an embodiment, the specific time in the future may be a time point obtained by the current time point plus a latency in ordering a target item to the target exchange server 130. That is, it is possible to predict the price of the target item near the time point when the order is expected to arrive at the target exchange server 130 in consideration of the latency. The machine learning model for deriving future market prediction data associated with the order for the target item will be described in detail below with reference to FIGS. 7 and 11.

According to an embodiment, instead of directly providing the market prediction reference data generated by the input generation unit 330 to the dedicated accelerator 340 for the machine learning model, the processor (e.g., at least one processor for pre/post processing) may first determine whether to use the machine learning model and then transmit the market prediction reference data to the dedicated accelerator 340 for the machine learning model only if it is determined to use the machine learning model. For example, the processor may determine a prediction complexity based on the market prediction reference data generated by the input generation unit 330, and according to the determined prediction complexity, determine whether to generate the orders (or future market prediction data associated with orders) by using the machine learning model or to generate orders by using a predetermined rule. In this case, the prediction complexity may include two or more complexity classes (e.g., low, moderate, high, etc.) according to the complexity. The internal components of the processor including the complexity determining unit, and the process of determining the prediction complexity by the complexity determining unit and processing the market prediction reference data accordingly, will be described in detail below with reference to FIGS. 4 and 5.

The order generation unit 350 may receive the future market prediction data from the machine learning model, and generate orders in the target exchange server 130 based on the future market prediction data. For example, the order generation unit 350 may generate orders for the target item according to a predetermined rule based on the predicted price of the target item at time point of the future, which is inferred from the machine learning model. As a specific example, if the price of the target item is predicted to increase, the order generation unit 350 may immediately generate a new request order to buy a target item or correct the ask price of an existing request order to sell a target item. According to an embodiment, each order may include information on the type of order (new order, order cancellation, order correction), whether to buy or sell, price (ask price), quantity, etc. for the target item.

Additionally, the orders generated by the order generation unit 350 may be transmitted to the output handler 360. According to an embodiment, the output handler 360 may check a risk based on the generated orders, or determine whether or not a regulation on market making is satisfied. Additionally or alternatively, the output handler 360 may perform appropriate processing on the previously generated orders according to the format, standard, and protocol of the orders required by the target exchange server 130.

The orders generated by the order generation unit 350 (or post-processed by the output handler 360) may be transmitted to the target exchange server 130. According to an embodiment, the processor (e.g., at least one processor for pre/post processing) may receive a market response to the transmitted orders in the target exchange associated with the target exchange server 130. In this case, the processor may update the order details for the target exchange server 130 based on the received market response, and the order details for the target exchange server 130 may be used as market-related information to create a next order, or may be used as basic data for the order generating unit 350 to create an order.

Figure 4:
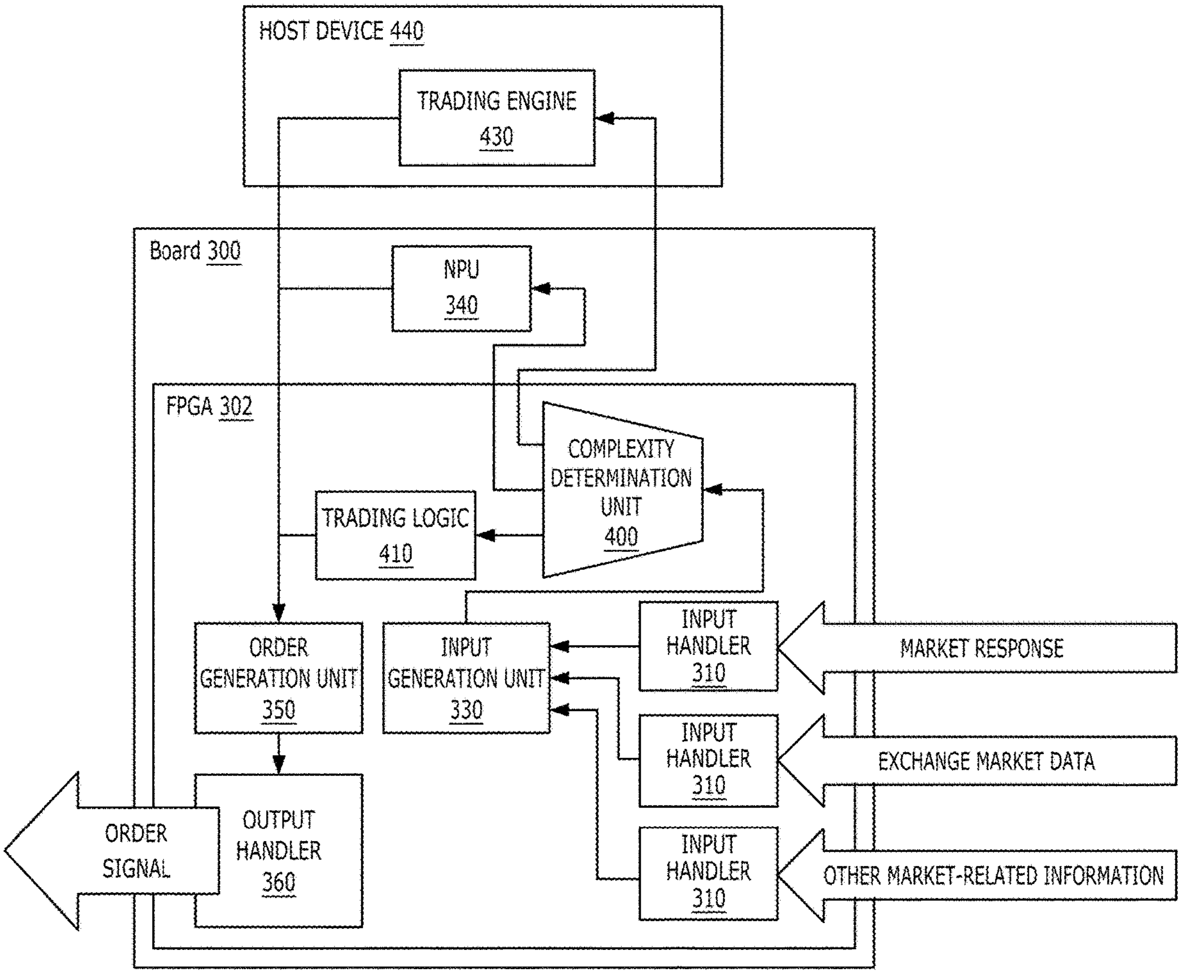
FIG. 4 is a diagram illustrating internal components of a processor including a complexity determining unit that determines prediction complexity according to an embodiment of the present disclosure.

FIG. 4 is a diagram illustrating internal components of the processor including the complexity determining unit 400 that determines prediction complexity according to an embodiment of the present disclosure.

The processor may further include a host device 440 for driving the complexity determining unit 400 and a trading engine 430 in addition to the components described above with respect to FIG. 3. In FIG. 4, the components newly added to the internal components of the processor described above with respect to FIG. 3 will be mainly described.

According to an embodiment, instead of directly providing the market prediction reference data generated by the input generation unit 330 to a dedicated accelerator 420 as input data for the machine learning model, the FPGA 302 may first determine whether to use the machine learning model and then provide the market prediction reference data to the dedicated accelerator 420 for the machine learning model only if it is determined to use the machine learning model. For example, the complexity determining unit 400 included in the processor may determine a prediction complexity based on market prediction reference data. And then, the complexity determining unit 400, according to the determined prediction complexity, may determine whether to generate the orders (or future market prediction data associated with the orders) by using a trading logic 410, or whether to generate the orders (or future market prediction data associated with the orders) using the machine learning model, or whether to generate the orders (or future market prediction data associated with the orders) by using the trading engine 430 included in the host device 440. For example, the complexity determining unit 400 may determine the prediction complexity based on the current market price, the order quantity for each order price, the number of counterparties for trading of the one or more items, etc. of one or more items included in the market prediction reference data. As another example, the complexity determining unit 400 may determine a data pattern of one or more reference features included in the market prediction reference data, determine whether or not the data pattern satisfies a predetermined condition, and then determine the prediction complexity according to the determination result.

In an embodiment, if the complexity determination unit 400 determines to generate the orders (or future market prediction data associated with the orders) by using the trading logic 410, the order generation unit 350 may generate the orders according to the trading logic 410 (e.g., predefined rules).

In another embodiment, if the complexity determination unit 400 determines to generate the future market prediction data associated with the orders by using the machine learning model, the market prediction reference data may be provided to the dedicated accelerator 420 as input data for machine learning, in which the dedicated accelerator 420 may process operations of at least a portion of the machine learning model, thereby generating future market prediction data associated with the orders from the market prediction reference data. The future market prediction data generated as described above may be provided to the order generation unit 350 of the processor, and the orders may be generated based on the future market prediction data.

In another embodiment, if the complexity determination unit 400 determines to generate the orders (or future market prediction data associated with the orders) by using the trading engine 430 included in the host device 440, the market prediction reference data may be provided to the host device 440, and the trading engine 430 included in the host device 440 may generate the orders by using a logic based on the predetermined rules, or derive future market prediction data associated with the orders based on the market prediction reference data by using a relatively light machine learning model. The future market prediction data associated with the orders derived by the trading engine 430 may be provided to the order generation unit 350 of the processor. In an embodiment, if the trading engine 430 generates the orders using a logic based on a predefined rule, the orders may be directly fed to the output handler 360 of the processor without going through the order generating unit 350 of the processor.

A method of determining the prediction complexity based on the market prediction reference data and processing the market prediction reference data accordingly will be described in more detail below with reference to FIG. 5.

Figure 5:
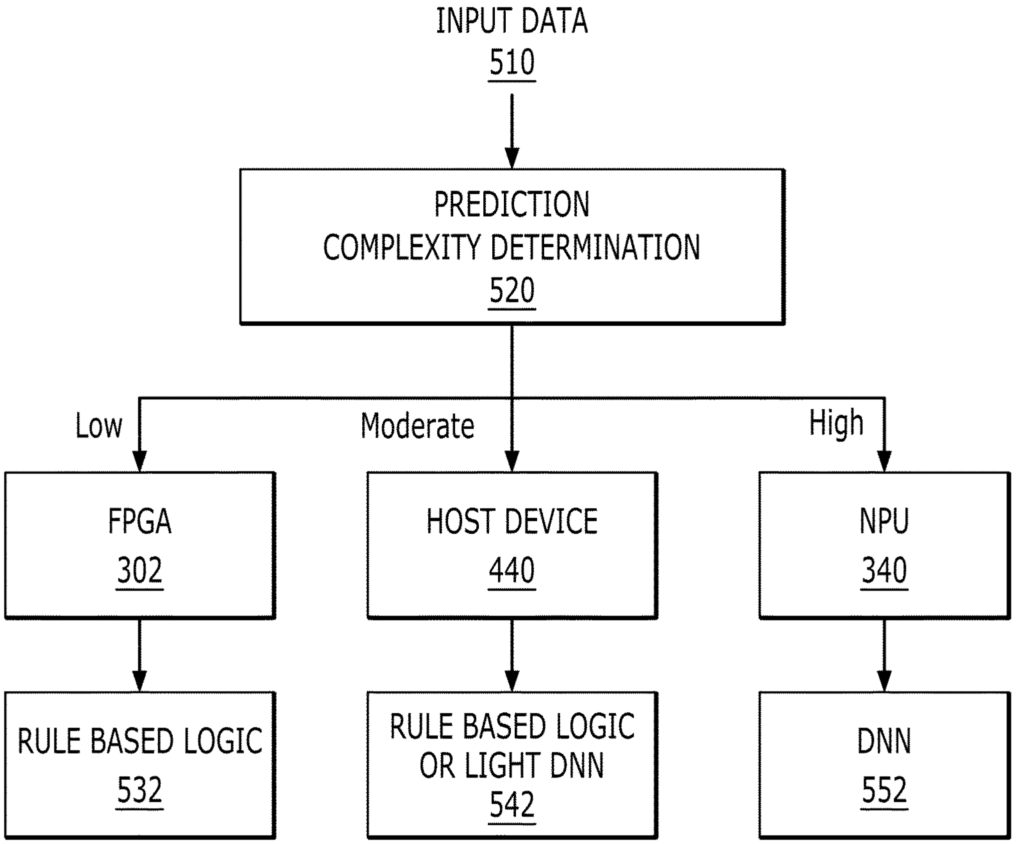
FIG. 5 is a diagram illustrating an example of a method of determining a prediction complexity and determining whether or not to use a machine learning model according to the determined prediction complexity, according to an embodiment of the present disclosure.

FIG. 5 is a diagram illustrating an example of a method of determining a prediction complexity 520 and determining whether or not to use a machine learning model 552 according to the determined prediction complexity, according to an embodiment of the present disclosure.

The FPGA 302 of the high frequency trading apparatus 110 or high frequency orders generating apparatus may generate market prediction reference data 510 (e.g., reference feature map) based on the market-related information, and determine the prediction complexity 520 based on the market prediction reference data 510. According to an embodiment, the prediction complexity may reflect at least one of a complexity of the market prediction reference data or an operational complexity for inferring data associated with an order based on the market prediction reference data. In addition, in an embodiment, the prediction complexity may be classified into two or more complexity classes. For example, the prediction complexity may be classified into three complexity classes of low, moderate, and high, as illustrated.

According to an embodiment, the processor may determine the prediction complexity 520 based on the current market price, the order quantity for each order price, the number of counterparties for trading of the one or more items, etc. of one or more items included in the market prediction reference data 510. According to another embodiment, the processor may determine a data pattern of one or more reference features included in the market prediction reference data 510, determine whether or not the data pattern satisfies a predetermined condition, and then determine the prediction complexity 520 according to the determination result.

For example, for the reference item having a very high statistical correlation with the target item, if a variation of the moving average of the median price (e.g., a weighted average of ToB prices of the buying side and ToB prices of the selling side) is equal to or greater than a first predetermined threshold, or equal to or less than a second predetermined threshold, the processor may classify the prediction complexity into a low class. Specifically, by comparing the moving average of the median price of the reference item in the interval $$T = \left[t, t - \frac{M}{2}\right]$$

with the moving average of the median price of the reference item in the interval $$T = \left[t - \frac{M}{2} + 1, t - M + 1\right],$$

if the former is $\tau_1(>1)$ times the latter or greater, it may be determined that the price of the target item is predicted to increase with high probability, and thus the prediction complexity may be determined into the low class. Alternatively, if the former is $\tau_2(<1)$ times the latter or less, it may be determined that the price of the target item is predicted to decrease with high probability, and thus the prediction complexity may be determined into the low class. If the former is neither $\tau_1(>1)$ times the latter or greater, nor $\tau_2(<1)$ times the latter or less, the prediction complexity may be determined into a moderate class or high class.

As another example, for all reference items included in the market prediction reference data 510, if the variance of the median price for a specific time period is equal to or less than a third predetermined threshold, since the possibility of price variation is low, it may be determined that a profit according to the spread can be achieved, and the prediction complexity may be determined into the low class.

According to an embodiment, the processor may first determine the prediction complexity 520 based on the market prediction reference data 510 and then determine whether or not to generate the orders (or future market prediction data associated with the order) by using the machine learning model according to the determined prediction complexity. In an embodiment, if the prediction complexity is determined into the low class, FPGA 302 may generate the orders based on the market prediction reference data according to a rule-based logic 532. For example, for a reference item having a statistically very high correlation with the target item, if the variation of the moving average of the median price is equal to or greater than the first predetermined threshold, it may be determined that the price of the target item will increase, and an order to buy the target item may be generated. If the variation of the moving average of the median price is equal to or less than the second predetermined threshold, it may be determined that the price of the target item will decrease, and an order to sell the target item may be generated. In another example in which the FPGA 302 generates the orders according to the rule-based logic 532, for all reference items included in the market prediction reference data 510, if a variance of the median price for a specific time period is equal to or less than a third predetermined threshold, an order to buy and an order to sell may be generated in both ToBs to achieve a profit according to the spread. In this case, as there occur deviations from the criteria described above (if variance is increased) over time, an order to cancel the existing order may be generated in order to minimize the risk caused by price variation.

In another embodiment, if the prediction complexity is determined into the high class, the FPGA 302 may provide the market prediction reference data 510 to a dedicated accelerator 550 (e.g., a dedicated accelerator implemented in the ASIC) for the machine learning model 552, in which the dedicated accelerator 550 may generate future market prediction data associated with the order for the target item based on the market prediction reference data 510 by using the machine learning model 552. For example, the dedicated accelerator 550 may process at least some operations of the machine learning model 552 to generate the future market prediction data that predicts the price of a target item (market price or median price) at a specific point in the future based on the market prediction reference data 510.

In another embodiment, if the prediction complexity is determined into the moderate class, the FPGA 302 may provide the market prediction reference data 510 to the host device 440. The host device 440 may use a rule-based logic or light machine learning model 542 with the market prediction reference data 510 to generate the orders or future market prediction data associated with the order.

As described above, by determining the prediction complexity based on the market prediction reference data and generating future market prediction data by using the machine learning model if the prediction complexity is high, it is possible to find the features that classical algorithms cannot find and also to predict exact future market. Moreover, by determining the prediction complexity based on the market prediction reference data and generating the orders directly by using relatively simple trading logic if the prediction complexity is low, it is possible to quickly transmit orders and gain an edge in trading.

Figure 6:
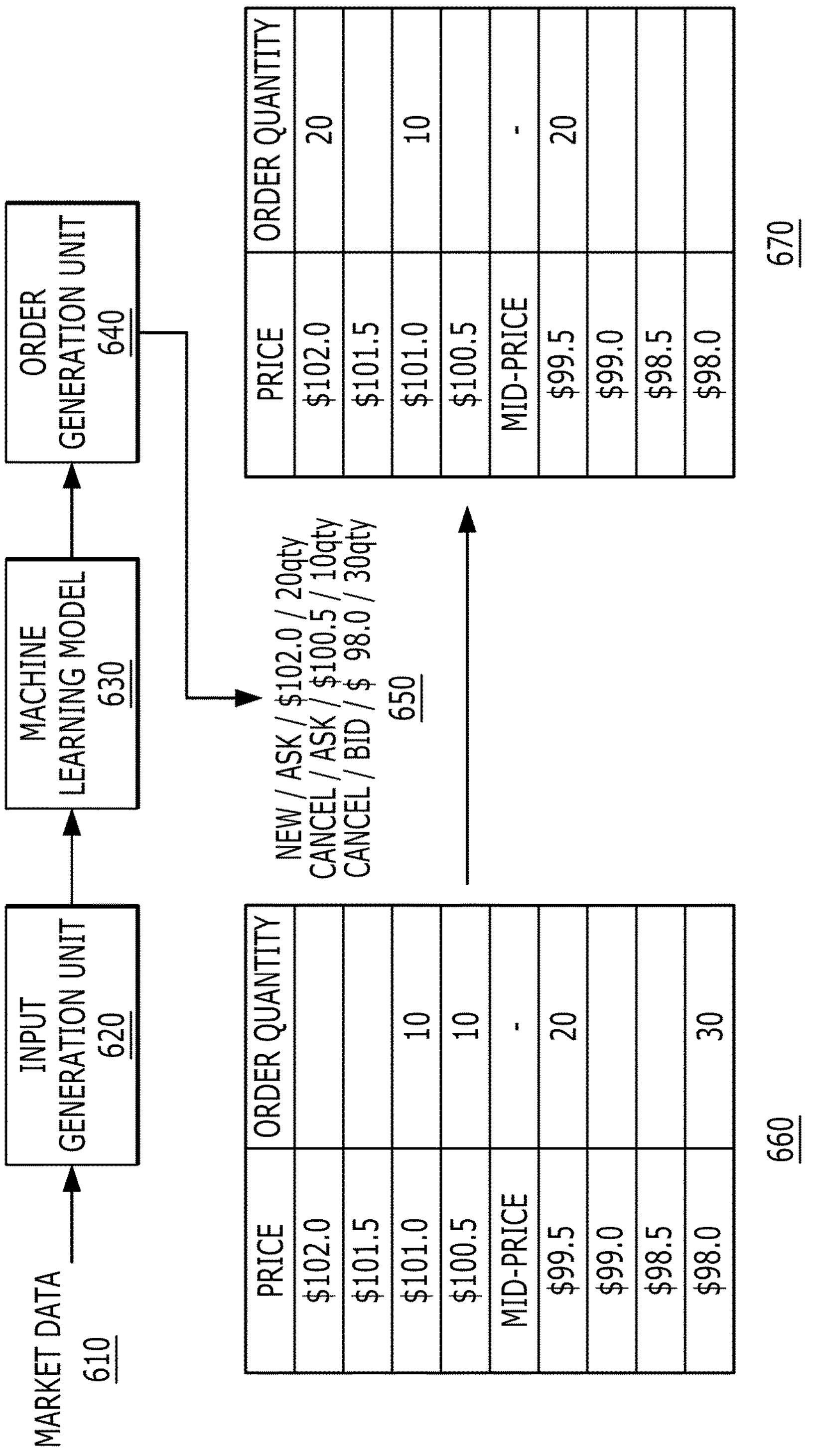
FIG. 6 is a diagram illustrating an example of a method for generating high frequency orders according to an embodiment of the present disclosure.

FIG. 6 is a diagram illustrating an example of a method for generating high frequency orders according to an embodiment of the present disclosure. According to an embodiment, the processor (e.g., at least one processor included in the apparatus for generating high frequency orders) may generate market prediction reference data 620 based on market-related information 610, and generate future market prediction data associated with an order based on the market prediction reference data 620 by using a machine learning model 630. The future market prediction data generated as described above may be fed to an order generation unit 640. And then the order generation unit 640 may generate orders for a target item to the target exchange server 130.

According to an embodiment, each order signal generated by the order generation unit 640 may include information on the type of order (e.g., new orders, cancellation orders, correction orders, etc.), whether to buy or sell, a price, an order quantity, etc. Here, the order signal may include one or more orders. For example, as illustrated, the order generation unit 640 may generate order signal 650 including three orders of "new/sell/$102.0/20 qty", "cancel/sell/$100.5/10 qty", and "cancel/buy/$98.0/30 qty" (indicating, in order, order type/buy or sell/order price/order quantity) based on the future market prediction data received from the machine learning model 630.

The generated order signal 650 may be transmitted to the target exchange server 130, and the processor may receive a market response to the transmitted order in the target exchange associated with the target exchange server 130. According to this market response, the processor may update the order details for the target item. In this case, the order details may refer to a list of currently valid orders (canceled or unconcluded orders) among the orders transmitted by the apparatus for generating high frequency orders. For example, after the order signal 650 illustrated in FIG. 6 is transmitted to the target exchange server 130, if a market response is received from the target exchange server 130 indicating that all three orders included in the order signal 650 have been normally received, the order details for the target item may be updated by reflecting the order signal 650. Specifically, if order details 660 before transmitting the order signal 650 include "sell/$101.0/10 qty", "sell/$100.5/10 qty", "buy/$99.5/20 qty", and "buy/$98.0/30 qty", updated order details 670 may be changed to "sell/$102.0/20 qty", "sell/$101.0/10 qty", and "buy/$99.5/20 qty". Then, the updated order details 670 may be included in the data (e.g., market-related information or data considered by the order generation unit, etc.), which is based on for generating the order signal by the apparatus for generating the high frequency orders. The order details may also be referred to as an open order or an order map.

Figure 7:
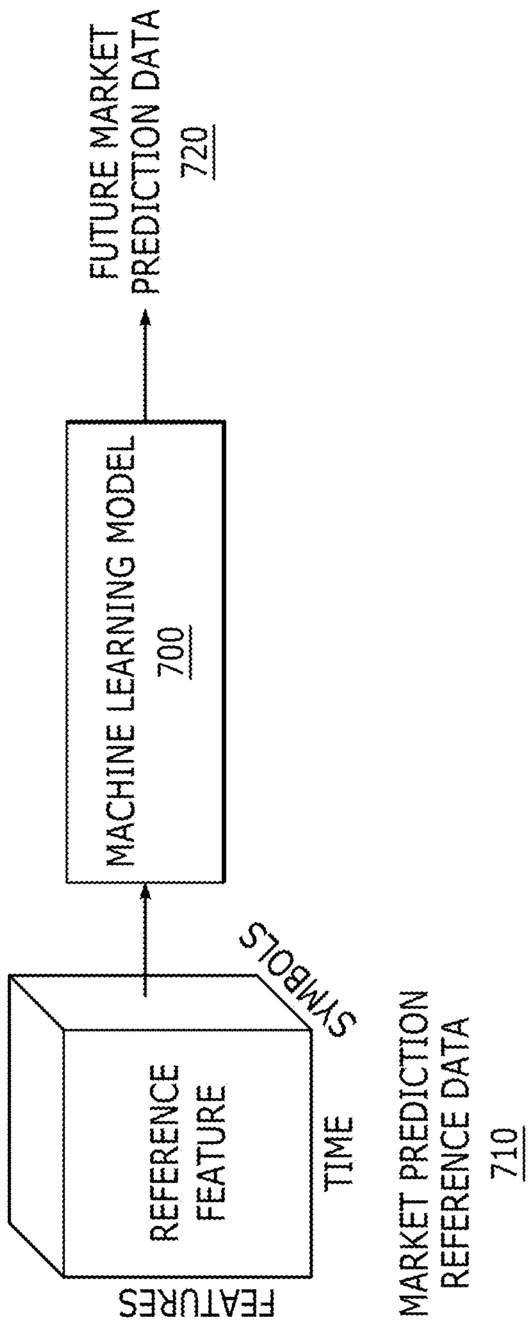
FIG. 7 is a diagram illustrating an example in which a machine learning model outputs future market prediction data based on market prediction reference data according to an embodiment of the present disclosure.

FIG. 7 is a diagram illustrating an example in which a machine learning model 700 outputs future market prediction data 720 based on market prediction reference data 710 according to an embodiment of the present disclosure. According to an embodiment, the machine learning model 700 may output the future market prediction data 720 associated with an order of a target item based on the market prediction reference data 710. For example, the machine learning model may output a predicted price (e.g., a market price or a median price, etc.) of a target item at a specific point in the future based on the market prediction reference data 710. According to an embodiment, the market prediction reference data 710 fed to the machine learning model 700 may include a reference feature map including one or more reference features for one or more items at one or more time points. The market prediction reference data 710 corresponding to input data of the machine learning model 700 will be described in detail below with reference to FIG. 8.

According to an embodiment, the machine learning model 700 may be trained to infer future market prediction data associated with orders in a target exchange server 130 by using market prediction reference data generated based on market-related information data from one or more market-related information servers 120. For example, the machine learning model 700 may be trained by supervised learning to infer the median price of the target item at the next time point based on market prediction reference data in a time interval including a total of M consecutive time points, by using market prediction reference data from time point (t) to time point (t+M−1) generated based on reference market data of one or more exchanges associated with the one or more exchange servers 120 and reference market data of the target exchange associated with the target exchange server 130, and median price data of the target item at time point (t+1).

The future market prediction data 720 output by the machine learning model 700 may include information associated with orders in the target exchange server, and a processor (e.g., at least one processor of a high frequency trading apparatus 110 or apparatus for generating high frequency orders) may generate orders for the target item based on a predetermined rule based on the future market prediction data 720.

According to an embodiment, the machine learning model 700 of the present disclosure may be an artificial neural network model. The artificial neural network model will be described below in detail with reference to FIG. 11.

Figure 8:
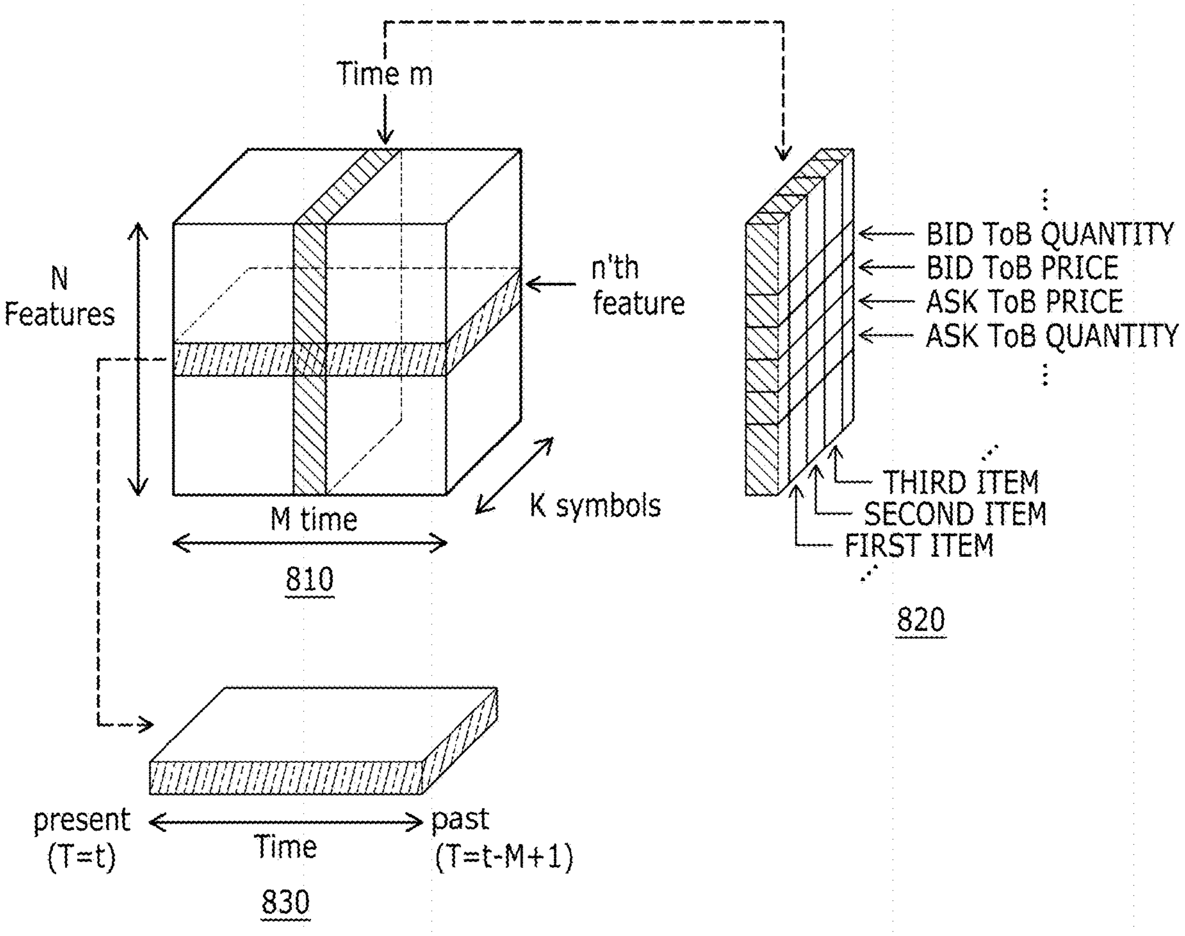
FIG. 8 is a diagram illustrating an example of a configuration of market prediction reference data for a machine learning model according to an embodiment of the present disclosure.

FIG. 8 is a diagram illustrating an example of a configuration of market prediction reference data 810 for the machine learning model according to an embodiment of the present disclosure. The high frequency trading apparatus 110 (e.g., at least one processor included in the high frequency trading apparatus 110) may generate the market prediction reference data 810 based on market-related information received from one or more market-related information servers 120. According to an embodiment, the market prediction reference data 810 may include a reference feature map including one or more reference features for one or more items at one or more time points.

For example, the reference feature map may include N reference features for K reference items at M time points, as illustrated in FIG. 8. In the illustrated example, data 820 at a specific time point (time (m) in FIG. 8) in a reference feature map included in the market prediction reference data may include one or more reference features (the price and quantity at the top of the order book on the buying side, the price and quantity at the top of the order book on the selling side in FIG. 8) for one or more reference items (first reference item, second reference item, and third reference item in FIG. 8) at a specific time point. In addition, data 830 for a specific reference feature (n-th reference feature in FIG. 8) in the reference feature map included in the market prediction reference data may include specific reference features for one or more reference items at one or more time points (from time point (t−M+1) to time point (t) in FIG. 8). In an embodiment, the reference feature map may be generated such that one or more reference features for different reference items intersect each other.

According to an embodiment, the one or more reference items included in the market prediction reference data 810 may be items serving as a leading indicator of the market conditions of the target item to be ordered. For example, if the target item to be ordered is the company A's stocks (spot), futures stocks related to the company A's stock, option stocks related to the company A's stock, stocks related company A included in another exchange, and futures stocks for products related to company A, etc. may be included in the one or more reference items. In an embodiment, the one or more reference items may include a target item. That is, the high frequency trading apparatus 110 may predict the future market conditions of the target item based on the market prediction reference data including the data on the target item. In addition, in an embodiment, the information on each reference item may be included as a code (symbol) associated with each reference item.

According to an embodiment, one or more reference features included in the market prediction reference data 810 may include information meaningful in predicting market conditions of a target item. For example, the reference features may include various information extractable from the order book of one or more reference items, such as a market price (transaction price), a price and quantity at the top of the order book of a buying side, a price and quantity at the top of the order book of a selling side, the number of sellers wishing to sell, the ask price for buy of the next stage at the top of the order book, the ask price for sell of the next stage at the top of the order book, the variance of the ask price included in the order book, etc., information obtained by processing the information and/or reliability of the information, etc. In an embodiment, these one or more reference features may be extracted from each of the one or more reference items.

The market prediction reference data 810 configured as described above may be transmitted to a dedicated accelerator for the machine learning model by a processor (e.g., at least one processor of a high frequency trading apparatus 110), and may be input to the machine learning model. Additionally or alternatively, the processor may determine the prediction complexity based on the market prediction reference data 810 to determine whether to use the machine learning model or to use a host device 440, or to generate orders based on rules within the corresponding processor. According to this determination, the market prediction reference data 180 may be transmitted to the dedicated accelerator or the host device 440 for a machine learning model, or may be used to derive future market prediction data associated with the order for the target item based on the rules within the corresponding processor.

Figure 9:
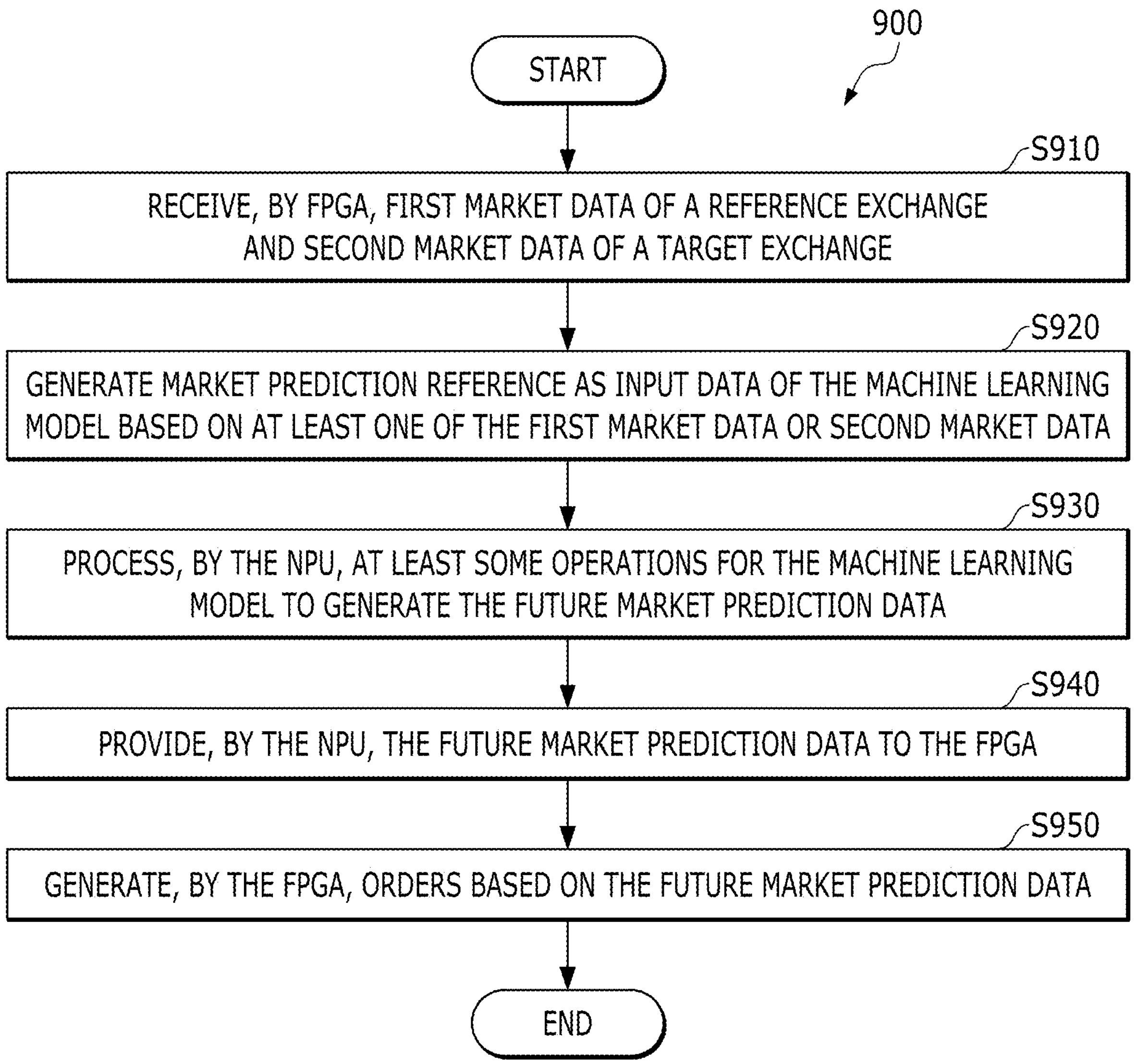
FIG. 9 is a flowchart illustrating an example of a method of operating a high frequency trading apparatus including an FPGA and an NPU according to an embodiment of the present disclosure.

FIG. 9 is a flowchart illustrating an example of a method 900 of operating the high frequency trading apparatus 110 including the FPGA 302 and the NPU 340 according to an embodiment of the present disclosure. According to an embodiment, at S910, the method 900 may be initiated by the FPGA 302 receiving first market data of a reference exchange associated with a reference exchange server and second market data of a target exchange associated with the target exchange server 130. Each market data may include transaction information, etc. on items traded in each exchange. For example, the first market data may include information on an order book of items traded in the reference exchanges associated with the one or more reference exchange servers, and the second market data may include at least a portion of market responses in the target exchange associated with the target exchange server 130 and information on the order book of one or more items (e.g., information on the ToB of the target item).

Then, at S920, the FPGA 302 may generate market prediction reference as input data of the machine learning model based on at least one of the first market data or the second market data. According to an embodiment, the market prediction reference data may include one or more reference features for one or more items at one or more time points, in which the information on the one or more items may be included as a code (symbol) for each item. In addition, the one or more items included in the market prediction reference data may include items indicating a leading indicator of a variation in market conditions of the target item and target items, and target items, which are targets of orders in the target exchange server 130.

According to an embodiment, before generating the market prediction reference data from the market data, parsing and decoding may be performed. For example, after parsing and decoding of at least one of the first market data or the second market data, the FPGA 302 may generate market prediction reference data as the input data of the machine learning model based on the result.

Then, at S930, the NPU 340 may process at least some operations for the machine learning model. For example, the NPU 340 may receive the market prediction reference data generated from the FPGA 302, feed the machine learning model with the market prediction reference data so that the machine learning model may perform a series of operations on the market prediction reference data to derive future market prediction data. According to an embodiment, the machine learning model may be any model configured to infer future market prediction data associated with orders in the target exchange server by using market prediction reference data generated based on reference market data of one or more exchanges.

According to an embodiment, instead of providing the generated market prediction reference data directly to the NPU 340, the FPGA 302 may determine a prediction complexity based on the market prediction reference data, and based on the determined prediction complexity, determine whether to generate the orders based on a predetermined rule or to use the machine learning model. In an embodiment, if it is determined to generate the orders according to the predetermined rule, the FPGA 302 may generate the orders according to the predetermined rule based on the market prediction reference data. In another embodiment, if it is determined to generate orders by using the machine learning model, the NPU 340 may process at least some operations for the machine learning model, and provide future market prediction data output from the machine learning model to the FPGA 302.

Additionally, the high frequency trading apparatus 110 may further include a host device 440 configured to drive the trading engine, and the prediction complexity may include three complexity classes according to the complexity. For example, the prediction complexity may include three complexity classes of high, moderate, and low according to the complexity. In this case, the market prediction reference data may be provided to at least one of the FPGA 302, the host device 440, or the NPU 340 according to three complexity classes to generate orders in the target exchange server 130.

Then, at S940, the NPU 340 may provide the future market prediction data output from the machine learning model to the FPGA 302. At S950, the FPGA 302 may generate orders in the target exchange server 130 based on the future market prediction data received from the machine learning model. Additionally, the FPGA 302 may process the generated orders according to a protocol required by the target exchange server 130. The orders generated (processed according to a protocol required by the target exchange server 130) as described above may be transmitted to the target exchange server 130.

Figure 10:
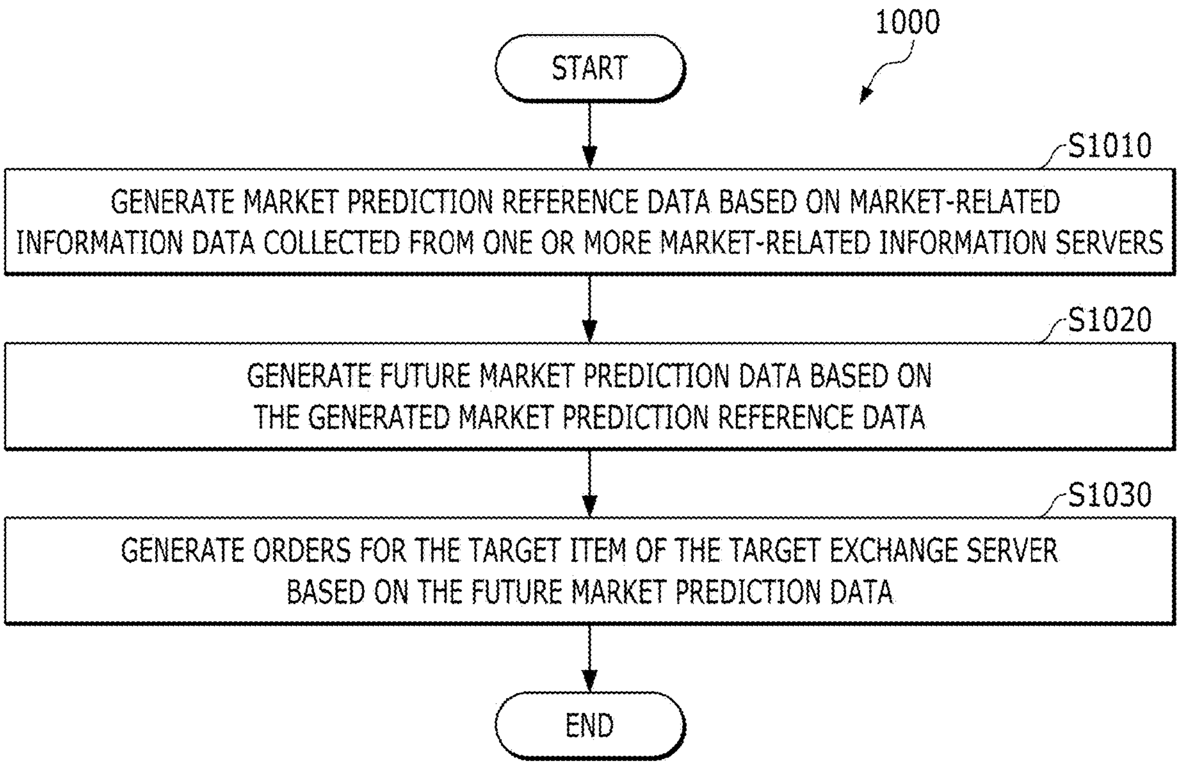
FIG. 10 is a flowchart illustrating an example of a method for generating high frequency orders according to an embodiment of the present disclosure.

FIG. 10 is a flowchart illustrating an example of a method 1000 for generating high frequency orders according to an embodiment of the present disclosure. According to an embodiment, at S1010, the method 1000 may be initiated by a processor (e.g., at least one processor of an apparatus for generating high frequency orders) generating market prediction reference data based on market-related information data collected from one or more market-related information servers 120. In an embodiment, the market prediction reference data may include a reference feature map including one or more reference features for one or more items at one or more time points, and the one or more reference features may be extracted from each of the one or more reference items. According to an embodiment, the one or more reference items included in the market prediction reference data may include a target item.

Then, at S1020, the processor may generate future market prediction data associated with the order of the target exchange server from the machine learning model based on the generated market prediction reference data. In this example, the machine learning model may be any machine learning model configured to infer future market prediction data associated with an order in the target exchange by using market prediction reference data generated based on market-related information. According to an embodiment, the future market prediction data received from the machine learning model may include data associated with the price prediction of the target item at a specific time point, in which the specific time point may be a time point obtained by the current time point plus a latency in ordering a target item to the target exchange server 130.

Alternatively, the processor may first determine the prediction complexity based on the reference feature map and then determine whether or not to apply the market prediction reference data to the machine learning model based on the determined prediction complexity, and provide the market prediction reference data to the machine learning model only if it is determined to apply the market prediction reference data to the machine learning model. In this case, the prediction complexity may be determined in various ways. For example, the processor may determine the prediction complexity based on the information included in the reference feature map such as the current price of one or more items, the number of items per order price, and the number of counterparties of the one or more items. As another example, the processor may determine a data pattern of one or more reference features of the information included in the reference feature map, determine whether or not the determined data pattern satisfies a predetermined condition, and then determine the prediction complexity according to the determination result.

Then, at S1030, the processor may generate the orders for the target item of the target exchange server based on the future market prediction data. According to an embodiment, each order may include information on the type of order (e.g., new orders, cancellation orders, or correction orders), whether to buy or sell, a price, and a quantity for the target item.

According to an embodiment, the generated orders may be transmitted to the target exchange server 130, and a response according to the transmission of the orders may be received from the target exchange server. In this case, the target exchange order details may be updated based on the response to the orders transmission, and the updated target exchange order details may be included in the market-related information and used to generate another order.

Figure 11:
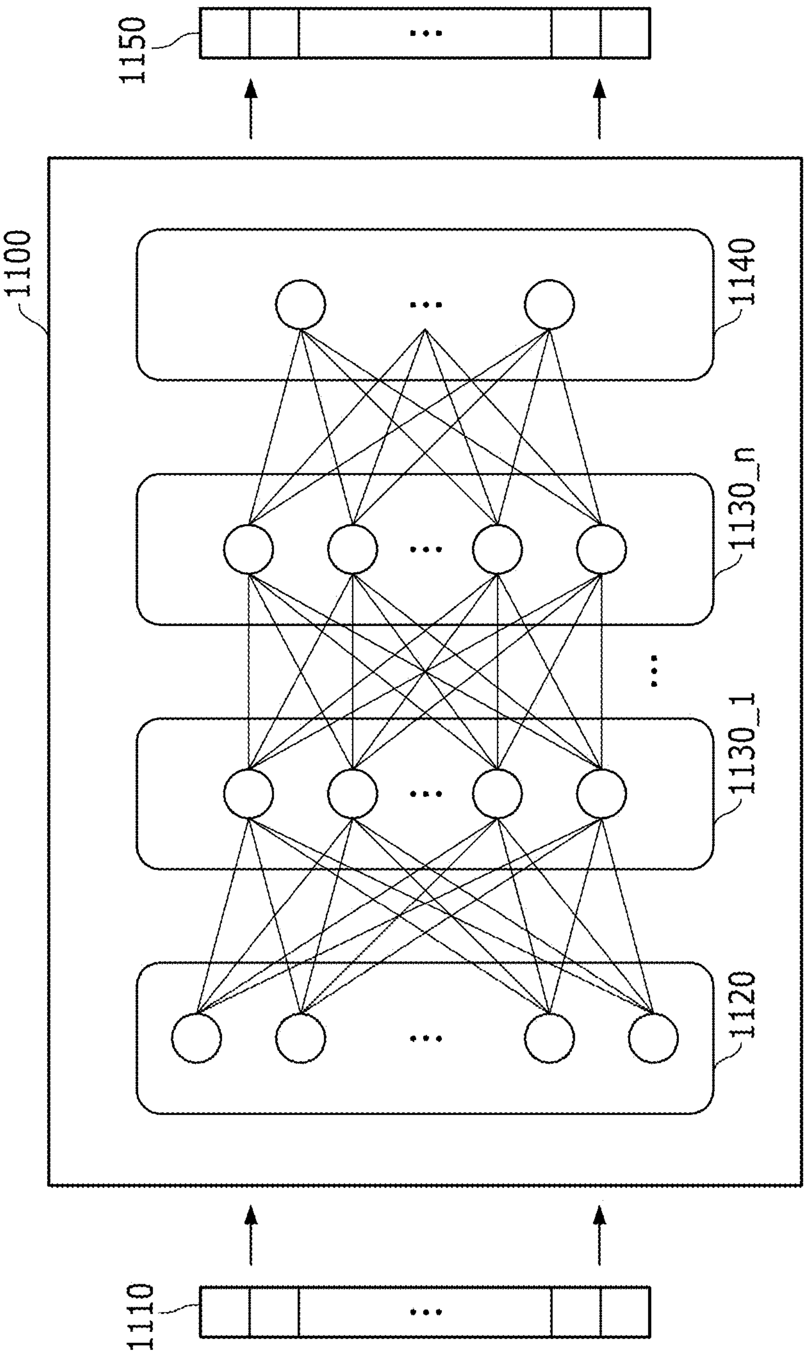
FIG. 11 illustrates an example of an artificial neural network model according to an embodiment of the present disclosure.

FIG. 11 illustrates an example of an artificial neural network model 1100 according to an embodiment of the present disclosure. In machine learning technology and cognitive science, the artificial neural network model 1100 as an example of the machine learning model refers to a statistical learning algorithm implemented based on a structure of a biological neural network, or to a structure that executes such algorithm.

According to an embodiment, the artificial neural network model 1100 may represent a machine learning model that acquires a problem solving ability by repeatedly adjusting the weights of synapses by the nodes that are artificial neurons forming the network through synaptic combinations as in the biological neural networks, thus training to reduce errors between a target output corresponding to a specific input and a deduced output. For example, the artificial neural network model 1100 may include any probability model, neural network model, etc., that is used in artificial intelligence learning methods such as machine learning and deep learning.

According to an embodiment, the neural network model 1100 may include an artificial neural network model configured to infer data associated with an order in a target exchange server using market prediction reference data generated based on the market-related information from the one or more market-related information servers 120.

The artificial neural network model 1100 is implemented as a multilayer perceptron (MLP) formed of multiple nodes and connections between them. The artificial neural network model 1100 according to an embodiment may be implemented using one of various artificial neural network model structures including the MLP. As illustrated in FIG. 11, the artificial neural network model 1100 includes an input layer 1120 to receive an input signal or data 1110 from the outside, an output layer 1140 to output an output signal or data 1150 corresponding to the market prediction reference data, and (n) number of hidden layers 1130_1 to **1130_*n* (where n is a positive integer) positioned between the input layer 1120 and the output layer 1140 to receive a signal from the input layer 1120, extract the features, and transmit the features to the output layer 1140. In an example, the output layer 1140 receives signals from the hidden layers 1130_1 to 1130_*n*** and outputs them to the outside.

The method of training the artificial neural network model 1100 includes the supervised learning that trains to optimize for solving a problem with inputs of teacher signals (correct answers), and the unsupervised learning that does not require a teacher signal. In an embodiment, the neural network model 1100 may be trained by the supervised and/or unsupervised learning to infer the data associated with the orders in the target exchange server. For example, the artificial neural network model 1100 may be trained by the supervised learning to infer the reference price of the target item at a specific time from the market prediction reference data.

The artificial neural network model 1100 trained as described above may be stored in the memory of a high frequency trading apparatus 110 or a memory (not illustrated) of the apparatus for generating high frequency orders, and infer the data associated with the orders in the target exchange server in response to the input of data received from the communication module and/or memory.

According to an embodiment, the market prediction reference data of an artificial neural network model for inferring data associated with the orders in the target exchange server may include one or more reference features for one or more items at one or more time points. For example, the market prediction reference data input to the input layer 1120 of the artificial neural network model 1100 may be a vector 1110 in which data including information on one or more reference features for one or more items at one or more time points is configured as one vector data element. In response to the input of data, future market prediction data received from the output layer 1140 of the artificial neural network model 1100 may be a vector 1150 representing or characterizing the data associated with the order in the target exchange server. That is, the output layer 1140 of the artificial neural network model 1100 may be configured to output a vector representing or characterizing the data associated with the order in the target exchange server. The future market prediction data that the artificial neural network model 1100 outputs is not limited to the type described above, and may include any information/data representing data associated with the order in the target exchange server.

As described above, the input layer 1120 and the output layer 1140 of the artificial neural network model 1100 are respectively matched with a plurality of future market prediction data corresponding to a plurality of market prediction reference data, and the synaptic values between nodes included in the input layer 1120, and the hidden layers 1130_1 to **1130_*n*, and the output layer 1140 are adjusted, so that training can be processed to extract a correct output corresponding to a specific input. Through this training process, the features hidden in the market prediction reference data corresponding to the input data of the artificial neural network model 1100 may be confirmed, and the synaptic values (or weights) between the nodes of the artificial neural network model 1100 may be adjusted so as to reduce the errors between the future market prediction data calculated based on the market prediction reference data and the target output. The artificial neural network model 1100** trained as described above may output the data associated with the order in the target exchange server in response to the market prediction reference data.

Figure 12:
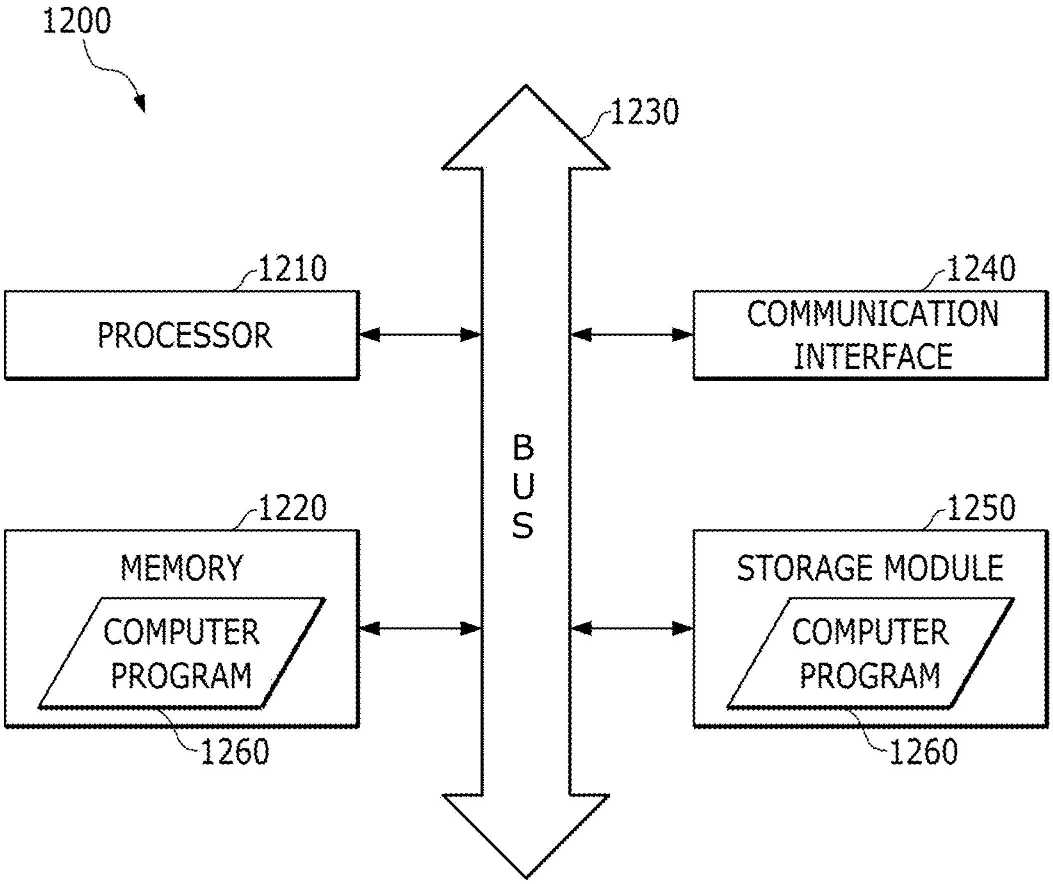
FIG. 12 is a block diagram of any computing device associated with high frequency trading or generation of high frequency orders according to an embodiment of the present disclosure.

FIG. 12 is a block diagram of any computing device 1200 associated with high frequency trading or generation of high frequency orders according to an embodiment of the present disclosure. For example, the computing device 1200 may include the information processing system 120 and/or the user terminal 130. As illustrated, the computing device 1200 may include one or more processors 1210, a bus 1230, a communication interface 1240, a memory 1220 for loading a computer program 1260 to be executed by the processors 1210, and a storage module 1250 for storing the computer program 1260. Meanwhile, only the components related to the embodiment are illustrated in FIG. 12. Accordingly, those of ordinary skill in the art to which the present disclosure pertains will be able to recognize that other general-purpose components may be further included in addition to the components illustrated in FIG. 12.

The processors 1210 control the overall operation of each component of the computing device 1200. The processor 1210 may include central processing unit (CPU), micro processor unit (MPU), micro controller unit (MCU), graphic processing unit (GPU), neural processing unit (NPU), or any type of processor well known in the technical field of the present disclosure. In addition, the processors 1210 may perform an arithmetic operation on at least one application or program for executing the method according to the embodiments of the present disclosure. The computing device 1200 may include one or more processors. For example, the computing device 1200 may include a processor implemented in an FPGA 302, and a dedicated accelerator for a machine learning model implemented in an ASIC (NPU ASIC).

The memory 1220 may store various types of data, commands, and/or information. The memory 1220 may load one or more computer programs 1260 from the storage module 1250 in order to execute the method/operation according to various embodiments of the present disclosure. The memory 1220 may be implemented as a volatile memory such as RAM, although the technical scope of the present disclosure is not limited thereto.

The bus 1230 may provide a communication function between components of the computing device 1200. The bus 1230 may be implemented as various types of buses such as an address bus, a data bus, a control bus, or the like.

The communication interface 1240 may support wired/wireless Internet communication of the computing device 1200. In addition, the communication interface 1240 may support various other communication methods in addition to the Internet communication. To this end, the communication interface 1240 may include a communication module well known in the technical field of the present disclosure.

The storage module 1250 may non-temporarily store one or more computer programs 1260. The storage module 1250 may include a nonvolatile memory such as a read only memory (ROM), an erasable programmable ROM (EPROM), an electrically erasable programmable ROM (EEPROM), a flash memory, etc., a hard disk, a detachable disk, or any type of computer-readable recording medium well known in the art to which the present disclosure pertains.

The computer program 1260 may include one or more instructions that, if loaded into the memory 1220, cause the processors 1210 to perform an operation/method in accordance with various embodiments of the present disclosure. That is, the processors 1210 may perform operations/methods according to various embodiments of the present disclosure by executing one or more instructions.

For example, the computer program 1260 may include instructions for generating the market prediction reference data based on the market-related information collected from the one or more market-related information servers 120, generating the future market prediction data associated with the order for the target exchange from the machine learning model based on the generated market prediction reference data, and generating the orders for the target item of the target exchange based on the future market prediction data. As another example, the computer program 1260 may include instructions for receiving, by the FPGA 302, first market data of the first exchange and second market data of the second exchange, generating, by the FPGA 302, market prediction reference data as the input data of the machine learning model based on at least one of the first market data or the second market data, processing, by the NPU 340, at least some operations for the machine learning model, providing future market prediction data output from the machine learning model to the FPGA 302, and generating, by the FPGA 302, the orders in the target exchange based on the future market prediction data received from the machine learning model.

Figure 13:
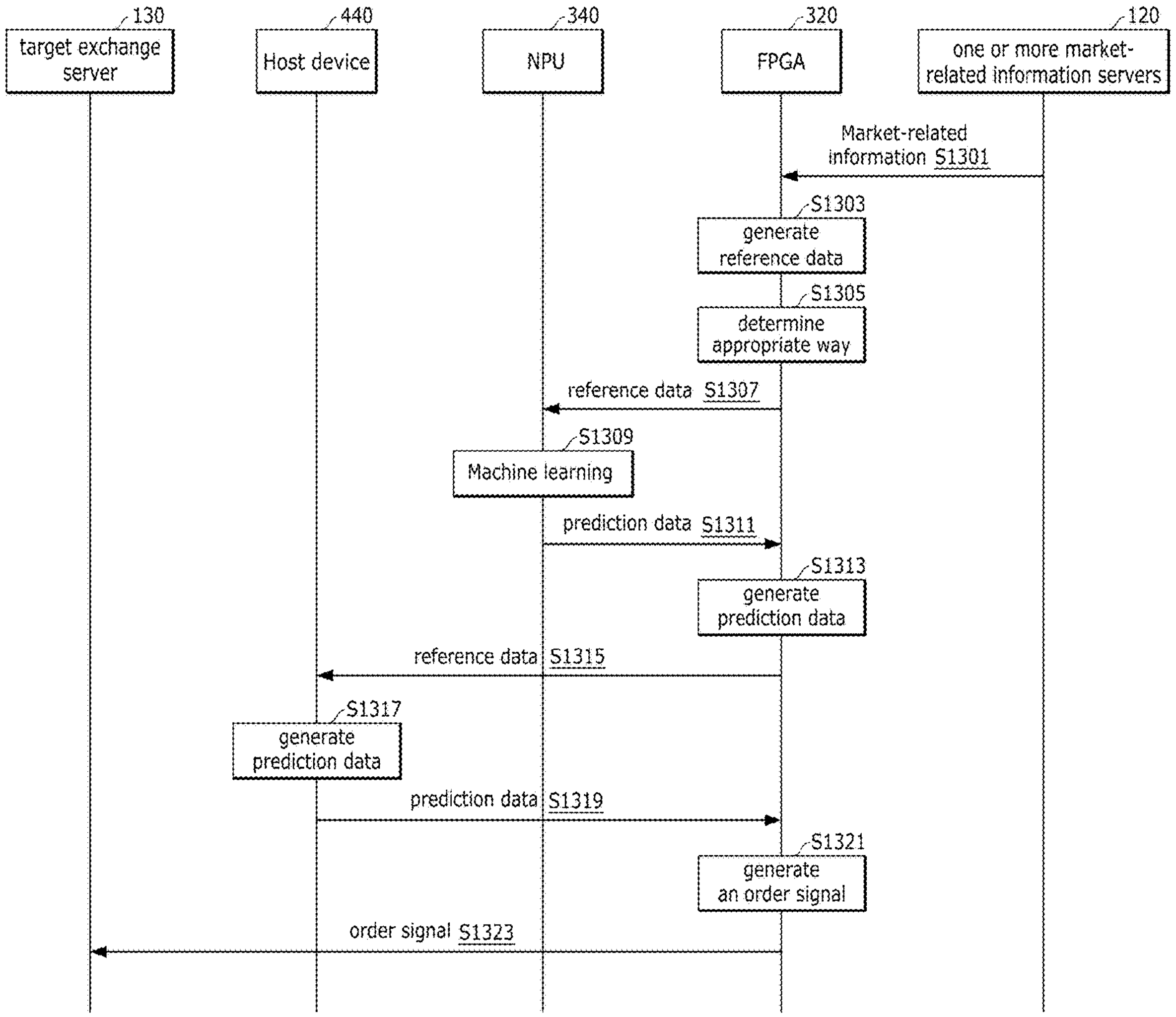
FIG. 13 is a ladder diagram illustrating an example signal exchange according to an embodiment of the present disclosure.

FIG. 13 is a ladder diagram illustrating an example signal exchange according to an embodiment of the present disclosure.

At S1301, the FPGA 302 may collect market-related information from one or more market-related information servers 120.

At S1303, the FPGA 302 may generate market prediction reference data based on the collected market-related information.

At S1305, the FPGA 302 may determine an appropriate way for predicting a future market based on the market prediction reference data. In some embodiments, the FPGA 302 may determine a prediction complexity based on the market prediction reference data, and then determine the appropriate way based on the prediction complexity. In some embodiments, the FPGA 302 may determine a prediction complexity between a low complexity and a high complexity or between a low complexity, a moderate complexity, and a high complexity. In some embodiments, the FPGA 302 may determine the appropriate way between the rule-based logic 532 and a machine learning model, or between the rule-based logic 532, a relatively light machine learning model, and a relatively heavy machine learning model. In some embodiments, the FPGA 302 may determine the rule-based logic 532, the relatively light machine learning model, and the relatively heavy machine learning model as the appropriate way when the prediction complexity is the low complexity, the moderate complexity, and the high complexity, respectively.

At S1307, if the FPGA 302 determines that the appropriate way is the relatively heavy machine learning model, the FPGA 302 may transmit the market prediction reference data to the NPU 340. In some embodiments, the FPGA 302 may transmit the market prediction reference data to the NPU 340 so that the NPU 340 may generate future market prediction data regardless of whether the FPGA 302 determines that that the appropriate way is the relatively heavy machine learning model.

At S1309, the NPU 340 may preform operations for the relatively heavy machine learning model with the market prediction reference data according to the machine learning model to generate the future market prediction data.

At S1311, the NPU 340 may transmit the future market prediction data to the FPGA 302.

At S1313, if the FPGA 302 determines that the appropriate way is the rule-based logic 532, the FPGA 302 may perform the rule-based logic 532 with the market prediction reference data to generate future market prediction data. In some embodiments, the FPGA 302 may generate an order signal without generating future market prediction data when the FPGA 302 determines that the appropriate way is the rule-based logic 532.

At S1315, if the FPGA 302 determines that the appropriate way is the relatively light machine learning model, the FPGA 302 may transmit the market prediction reference data to the host device 440. In some embodiments, the FPGA 302 may transmit the market prediction reference data to the host device 440 so that the host device 440 may generate future market prediction data regardless of whether the FPGA 302 determines that the appropriate way is the relatively light machine learning model.

At S1317, the host device 440 may generate the future market prediction data with the market prediction reference data. In some embodiments, the host device 440 may use a rule-based logic which is heavier than the rule-based logic 532 used by the FPGA 302. In some embodiments, the host device 440 may use a machine learning model which is lighter than the machine learning model used by the NPU 340.

At S1319, the host device 440 may transmit the future market prediction data to the FPGA 302.

At 51321, the FPGA 302 may generate an order signal based on the future market prediction data received from at least one of the FPGA 302, the NPU 340, or host device 440.

At S1323, the FPGA 302 may transmit an order signal to the target exchange server 130.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), FPGAs, processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The instructions may be executable by one or more processors, and may cause the processor(s) to perform certain aspects of the functions described in the present disclosure.

If implemented in software, the techniques may be stored on a computer-readable medium as one or more instructions or codes, or may be transmitted through a computer-readable medium. The computer-readable media include both the computer storage media and the communication media including any medium that facilitates the transfer of a computer program from one place to another. The storage media may also be any available media that may be accessed by a computer. By way of non-limiting example, such a computer-readable medium may include RAM, ROM, EEPROM, CD-ROM or other optical disk storage, magnetic disk storage or other magnetic storage devices, or any other media that can be used to transfer or store desired program code in the form of instructions or data structures and can be accessed by a computer. In addition, any connection is properly referred to as a computer-readable medium.

For example, if the software is transmitted from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor, such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the embodiments described above have been described as utilizing aspects of the currently disclosed subject matter in one or more standalone computer systems, the present disclosure is not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some embodiments herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. An apparatus for high frequency trading, comprising:

one or more memories;

at least one field programmable gate array (FPGA) coupled to the one or more memories, the at least one FPGA configured to receive market-related information from one or more servers, transform the market-related information to input data for inference in a machine learning model, and transmit the input data for inference to an application-specific integrated circuit (ASIC); and the ASIC configured to receive the input data for inference, perform operations for the machine learning model with the input data for inference to infer market prediction data, and transmit the market prediction data to the at least one FPGA, wherein the at least one FPGA is further configured to generate an order signal based on the market prediction data and transmit the order signal to a target exchange server.

2. The apparatus according to claim 1, wherein the ASIC is implemented as an integrated circuit for a neural processing unit (NPU).

3. The apparatus according to claim 1, wherein the at least one FPGA is further configured to determine a prediction complexity based on the input data for inference, and determine an appropriate way according to the determined prediction complexity, if it is determined that the appropriate way is a predetermined rule, the at least one FPGA is further configured to generate the order signal according to the predetermined rule based on the input data for inference, and if it is determined that the appropriate way is the machine learning model, the ASIC is further configured to perform operations for the machine learning model to infer the market prediction data and transmit the market prediction data to the at least one FPGA so that the at least one FPGA generates the order signal based on the market prediction data.

4. The apparatus according to claim 3, further comprising a host device configured to drive a trading engine, wherein the prediction complexity includes three complexity classes according to the prediction complexity, and the input data for inference is transmitted to at least one of the at least one FPGA, the host device or the ASIC for the machine learning model according to the three complexity classes to generate the order signal.

5. The apparatus according to claim 1, wherein the input data for inference includes one or more reference features for one or more reference items at one or more time points.

6. The apparatus according to claim 5, wherein the one or more reference items include a reference item representing a leading indicator, and a target item to be ordered.

7. The apparatus according to claim 1, wherein the market-related information includes information on an order book of one or more reference items in a reference exchange associated with a reference exchange server, and a response to a previous order in a target exchange associated with the target exchange server.

8. A method of operating an apparatus for high frequency trading including at least one field programmable gate array (FPGA), the method comprising:

receiving, by the at least one FPGA, market-related information from one or more servers;

transforming, by the at least one FPGA, the market-related information to input data for inference in a machine learning model;

transmitting, by the at least one FPGA, the input data for inference to an application-specific integrated circuit (ASIC) configured to perform operations of the machine learning model with the input data for inference to infer market prediction data;

receiving, by the at least one FPGA, the market prediction data from the ASIC;

generating, by the at least one FPGA, an order signal based on the market prediction data; and transmitting the order signal to a target exchange server.

9. The method according to claim 8, further comprising:

determining, by the at least one FPGA, a prediction complexity based on the input data for inference;

determining, by the at least one FPGA, an appropriate way according to the determined prediction complexity;

if it is determined that the appropriate way is a predetermined rule, generating, by the at least one FPGA, the order signal according to the predetermined rule based on the input data for inference; and if it is determined that the appropriate way is the machine learning model, transmitting, by the at least one FPGA, the input data for inference to the ASIC configured to perform operations of the machine learning model operations for the machine learning model with the input data for inference to infer market prediction data.

10. The method according to claim 9, wherein the prediction complexity includes three complexity classes according to the prediction complexity, and the input data for inference is transmitted to at least one of the at least one FPGA, a host device or the ASIC according to the three complexity classes to generate the order signal.

11. The method according to claim 8, further comprising:

parsing and decoding, by the at least one FPGA, the market-related information, and wherein transforming the market-related information comprises:

transforming the parsed and decoded market-related information to the input data for inference.

12. The method according to claim 8, wherein the input data for inference includes one or more reference features for one or more reference items at one or more time points.

13. The method according to claim 12, wherein the one or more reference items include a reference item representing a leading indicator, and a target item to be ordered.

14. The method according to claim 8, wherein the market-related information includes information on an order book of one or more reference items in a reference exchange associated with a reference exchange server, and a response to a previous order in a target exchange associated with the target exchange server.

15. An apparatus for high frequency trading, comprising:

one or more memories;

at least one field programmable gate array (FPGA) coupled to the one or more memories, the at least one FPGA configured to:

receive market-related information from one or more servers;

transform the market-related information to input data for inference;

perform at least one of an operation of generating a first market prediction data according to a predetermined rule based on the input data for inference, an operation of transmitting the input data for inference to an application-specific integrated circuit (ASIC) configured to perform operations of a machine learning model with the input data for inference to infer a second market prediction data, or an operation of transmitting the input data for inference to a host device configured to drive a trading engine configured to infer a third market prediction data based on the input data;

generate an order signal based on at least one of the first market prediction data, the second market prediction data, or the third market prediction data; and transmit the order signal to a target exchange server.

16. The apparatus according to claim 15, wherein the generating the first market prediction data includes generating the first market prediction data according to the predetermined rule based on the input data for inference.

17. The apparatus according to claim 15, wherein the ASIC is implemented as an integrated circuit for a neural processing unit (NPU).

18. The apparatus according to claim 15, wherein the input data for inference includes one or more reference features for one or more reference items at one or more time points.

19. The apparatus according to claim 18, wherein the one or more reference items include a reference item representing a leading indicator, and a target item to be ordered.

20. The apparatus according to claim 15, wherein the market-related information includes information on an order book of one or more reference items in a reference exchange associated with a reference exchange server, and a response to a previous order in a target exchange associated with the target exchange server.

* * * * *